(12) United States Patent
Miyata et al.

(10) Patent No.: US 6,932,739 B2
(45) Date of Patent: Aug. 23, 2005

(54) CONTINUOUSLY VARIABLE TRANSMISSION APPARATUS

(75) Inventors: Shinji Miyata, Kanagawa (JP); Hideki Hashitani, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/325,900

(22) Filed: Dec. 23, 2002

(65) Prior Publication Data

US 2003/0125154 A1 Jul. 3, 2003

(30) Foreign Application Priority Data

Dec. 25, 2001 (JP) ..................................... P. 2001-392514
Jan. 15, 2002 (JP) ..................................... P. 2002-006599

(51) Int. Cl.⁷ .......................... B60K 41/12; F16H 37/02
(52) U.S. Cl. ........................................ 477/41; 475/216
(58) Field of Search .............................. 477/39, 40, 41; 475/208, 209, 214, 215, 216

(56) References Cited

U.S. PATENT DOCUMENTS

| | | | |
|---|---|---|---|
| 4,682,518 A | * | 7/1987 | Takada et al. ................ 477/41 |
| 5,099,710 A | | 3/1992 | Nakano |
| 5,286,240 A | | 2/1994 | Kobayashi |
| 5,820,510 A | | 10/1998 | Ueda et al. |
| 5,888,160 A | * | 3/1999 | Miyata et al. .............. 475/216 |
| 6,030,311 A | | 2/2000 | Osumi |
| 6,074,320 A | | 6/2000 | Miyata et al. |
| 6,171,210 B1 | | 1/2001 | Miyata et al. |
| 6,251,039 B1 | | 6/2001 | Koga |
| 6,358,179 B1 | * | 3/2002 | Sakai et al. ................ 475/216 |
| 6,409,625 B1 | * | 6/2002 | Sakai et al. ................ 475/216 |
| 2002/0028722 A1 | * | 3/2002 | Sakai et al. ................ 475/214 |
| 2003/0069106 A1 | * | 4/2003 | Miyata et al. .............. 475/216 |

FOREIGN PATENT DOCUMENTS

| | | |
|---|---|---|
| JP | 1-169169 A | 7/1989 |
| JP | 1-312266 A | 12/1989 |
| JP | 11-63148 A | 3/1999 |
| JP | 11-193863 A | 7/1999 |
| JP | 11-210872 A | 8/1999 |
| JP | 2000-55178 A | 2/2000 |
| JP | 2001-50375 A | 2/2001 |
| JP | 2001-50380 A | 2/2001 |

* cited by examiner

*Primary Examiner*—Roger Pang
(74) *Attorney, Agent, or Firm*—Sughrue Mion, PLLC

(57) ABSTRACT

A continuously variable transmission apparatus has clutch device having a low speed clutch; a high speed clutch; and, a controller switching the transmission state into any one of a low speed mode and a high speed mode by connecting any one of the clutches, wherein timings for signaling by the controller for switching the connected and disconnected states of the clutches vary according to the switching directions of the low speed and high speed modes; and, a timing for signaling for connecting the low speed clutch with respect to the moment for signaling for cutting off the connection of the high speed clutch in order to switch the high speed mode over to the low speed mode is set earlier than a timing for signaling for connecting the high speed clutch with respect to the moment for signaling for cutting off the connection of the low speed clutch.

3 Claims, 21 Drawing Sheets

CONTINUOUSLY VARIABLE TRANSMISSION APPARATUS

BACKGROUND OF THE INVENTION

1. Field of the Invention

A continuously variable transmission apparatus according to the present invention is used as a transmission unit constituting an automatic transmission for a vehicle or as a transmission for any one of various kinds of industrial mechanical apparatus. Especially, a continuously variable transmission apparatus according to the present invention is developed in order to reduce an incongruous feeling given to a driver when switching a low speed mode and a high speed mode over to each other using a clutch mechanism.

2. Description of the Related Art

As an automatic transmission for a vehicle, such a toroidal-type continuously variable transmission as schematically shown in FIGS. 10 and 11 is known well because it is disclosed in many publications such as patent publications, and it is also enforced currently in part of the vehicle industry. When a toroidal-type continuously variable transmission of this type is in operation, as an input shaft 1 is rotated, a pressing device 2 such as a loading cam rotates an input side disk 3 while pressing the input side disk 3 against a plurality of power rollers 4, 4. And, the rotational power of the input side disk 3 is transmitted through the plurality of power rollers 4, 4 to an output side disk 5, so that an output shaft 6 fixed to the output side disk 5 is rotated.

To change the rotation speed between the input shaft 1 and output shaft 6, trunnions 7, 7 supporting the power rollers 4, 4 thereon are respectively swung about their associated pivot shafts 8, 8 which are disposed on the two end portions of each of the trunnions 7, 7 in such a manner that the pivot shafts 8, 8 are respectively concentric with their associated trunnions 7, 7. In this case, in case where the rotation center axes of the power rollers 4, 4 are swung in such a manner that the peripheral surfaces 4a, 4a of the power, rollers 4, 4, as shown in FIG. 10, can be respectively contacted with the near-to-center portion of the inner surface 3a of the input side disk 3 and the near-to-outer-periphery portion of the inner surface 5a of the output side disk 5, the rotation speed between the input shaft 1 and output shaft 6 can be reduced. On the other hand, in case where the rotation center axes of the power rollers 4, 4 are swung in such a manner that the peripheral surfaces 4a, 4a of the power rollers 4, 4, as shown in FIG. 11, can be respectively contacted with the near-to-outer-periphery portion of the inner surface 3a of the input side disk 3 and the near-to-center portion of the inner surface 5a of the output side disk 5, the rotation speed between the input shaft 1 and output shaft 6 can be increased.

While the basic structure of a toroidal-type continuously variable transmission is as described above, to swing the trunnions 7, 7 about their respective pivot shafts 8, 8 in order to change the transmission ratio, the trunnions 7, 7 may be shifted slightly in the axial direction (in FIGS. 10 and 11, in the front and rear direction of the sheets of FIGS. 10 and 11) of the pivot shafts 8, 8. As the trunnions 7, 7 are shifted in this manner, the direction of a force to be applied to the rolling contact portions between the above-mentioned surfaces 3a, 4a and 5a in the tangential direction thereof is caused to vary, with the result that trunnions 7, 7 can be swung. The structure of this portion is also well known because it is disclosed in many publications such as patent publications, and the present structure is currently enforced in part of the vehicle industry. Also, structures, each of which is used to increase the number of power rollers for use in power transmission to thereby be able to increase the power that can be transmitted by the toroidal-type continuously variable transmission, are also disclosed in many publications such as patent publications and thus are known well; and, part of these structures are now practically applied. As such structures for increasing the number of power rollers in this manner, for example, there are widely known a structure in which two pairs of input side and output side disks are disposed in parallel to each other with respect to the transmission direction of the power, and a structure in which the number of power rollers to be interposed between the input side and output side disks can be increased.

Further, as disclosed in JP-A-1-169169, JP-A-1-312266, JP-A-10-196759, JP-A-11-63146, JP-A-11-63148, and JP-A-2000-220719, conventionally, there is also proposed a structure in which a toroidal-type continuously variable transmission and a planetary gear transmission mechanism are combined together to thereby construct a continuously variable transmission apparatus. The present continuously variable transmission apparatus is invented so as to increase the width of the transmission ratio; or, to reduce the torque that passes through the toroidal-type continuously variable transmission when a vehicle is running at a high speed, thereby being able to enhance the durability of the toroidal-type continuously variable transmission; or, to allow a continuously variable transmission by itself to stop the output shaft even during the rotation of the input shaft, thereby being able to eliminate the need for provision of a start clutch.

Now, FIG. 12 shows an example of a conventional continuously variable transmission apparatus of the above-mentioned type which is disclosed in the above-cited JP-A-11-63146. This continuously variable transmission apparatus comprises a double cavity type of toroidal-type continuously variable transmission 9 and a planetary gear mechanism 10; and, specifically, in the toroidal-type continuously variable transmission 9, two pairs of input side and output side disks are disposed in parallel to each other with respect to the power transmission direction. And, according to this continuously variable transmission apparatus, in the low speed running operation, the power is transmitted only by the toroidal-type continuously variable transmission 9; and, in the high speed running operation, the power is transmitted mainly by the planetary gear mechanism 10 and, at the same time, the transmission ratio given by the planetary gear mechanism 10 can be adjusted by changing the transmission ratio of the toroidal-type continuously variable transmission 9.

For the above purpose, the base end portion (in FIG. 12, the right end portion) of an input shaft 1a passing through a centrosphere of the toroidal-type continuously variable transmission 9 and supporting a pair of input side disks 3, 3 on the two end portions thereof is connected to a transmission shaft 13, which is fixed to the central portion of a support plate 12 supporting a ring gear 11 constituting the planetary gear mechanism 10, by a high speed clutch 14. By the way, of the pair of input side disks 3, 3, the input side disk 3 disposed on the leading end side (in FIG. 12, the right side) of the input shaft 1a is supported on the input shaft 1a in such a manner that it is rotatable in synchronization with the input shaft 1a as well as it is prevented against substantial movement in the axial direction of the input shaft 1a. On the other hand, the input disk 3 on the base end side (in FIG. 12, the left side) is supported on the input shaft 1a in such a manner that it can be rotated in synchronization with the input shaft 1*a* as well as can be moved in the axial direction of the input shaft 1*a*.

Also, between the output side end portion (in FIG. 12, the right end portion) of a crankshaft 16 of an engine 15 serving as a drive source and the input side end portion (that is, the base end portion; in FIG. 12, the left end portion) of the input shaft 1*a*, there are interposed a start clutch 17 such as a torque converter or an electromagnetic clutch and an oil pressure type of pressing device 18 in such a manner that they are connected in series with each other with respect to the power transmission direction. This pressing device 18 is structured by inserting the base end portion of the input disk 3 into a cylinder 19 in such a manner that the input disk 3 is oiltight and is able to transmit the rotational power thereof.

Also, an output shaft 20, which is used to take out the power based on the rotational motion of the input shaft 1*a*, is disposed so as to be concentric with the input shaft 1*a*. And, on the periphery of the output shaft 20, there is disposed the planetary gear mechanism 10. A sun gear 21, which constitutes the planetary gear mechanism 10, is fixed to the input side end portion (in FIG. 12, the left end portion) of the output shaft 20. Therefore, the output shaft 20 can be rotated as the sun gear 21 is rotated. On the periphery of the sun gear 21, there is supported the ring gear 11 in such a manner that it is concentric with the sun gear 21 and can be rotated. And, between the inner peripheral surface of the ring gear 11 and the outer peripheral surface of the sun gear 21, there are interposed a plurality of planetary gear sets 23, 23 each of which comprises a pair of planetary gears 22*a* and 22*b* combined together. Each pair of planetary gears 22*a* and 22*b* are meshingly engaged with each other; and, the planetary gear 22*a* disposed on the outside diameter side is meshingly engaged with the ring gear 11, while the planetary gear 22*b* disposed on the inside diameter side is meshingly engaged with the sun gear 21. The thus arranged planetary gear sets 23, 23 are rotatably supported on one side surface (in FIG. 12, the left side surface) of a carrier 24. Also, the carrier 24 is rotatably supported on the middle portion of the output shaft 20.

And, the carrier 24 is connected to a pair of output side disks 5, 5 constituting the toroidal-type continuously variable transmission 9 by a first power transmission mechanism 25 in such a manner that the rotational power can be transmitted between them. The first power transmission mechanism 25 comprises a transmission shaft 26 disposed so as to extend in parallel to the input shaft 1*a* and output shaft 20, a sprocket 27*a* fixed to one end portion (in FIG. 12, the left end portion) of the transmission shaft 26, a sprocket 27*b* connected to the respective output disks 5, 5, a chain 28 interposed across the two sprockets 27*a* and 27*b*, and first and second gears 29, 30 which are respectively fixed to the other end (in FIG. 12, the right end) of the transmission shaft 26 and the carrier 24 and are meshingly engaged with each other. Thanks to this, as the respective output side disks 5, 5 are rotated, the carrier 24 can be rotated in the opposite direction to the output side disks 5, 5 at the speed that corresponds not only to the number of teeth of the first and second gears 29, 30 but also to the number of teeth of the pair of sprockets 27*a*, 27*b*.

On the other hand, the input shaft 1*a* can be connected to the ring sear 11 through another transmission shaft 13, which is disposed concentrically with the input shaft 1*a* and serves as a second transmission mechanism, in such a manner that the rotational power can be transmitted between them. Between this transmission shaft 13 and input shaft 1*a*, there is interposed the high speed clutch 14 in such a manner that it is arranged in series with the two shafts 13 and 1*a*. Therefore, the transmission 13, when the high speed clutch 14 is connected, can be rotated together with the input shaft 1*a* in the same direction and at the same speed.

Also, the present continuously variable transmission apparatus comprises the high speed clutch 14 and a low speed clutch 31 interposed between the outer peripheral edge portion of the carrier 24 and the axial-direction one end portion (in FIG. 12, the right end portion) of the ring gear 11. The low speed clutch 31 and high speed clutch 14 are structured such that, in case where any one of these clutches is connected, the connection of the other clutch is cut off. Also, in the example shown in FIG. 12, between the ring gear 11 and the fixed portion of the present continuously variable transmission apparatus such as a housing (not shown), there is interposed a reversing clutch 32. In case where any one of the low speed clutch 31 and high speed clutch 14 is connected, the connection of the reversing clutch 32 is cut off. Also, in case where the reversing clutch 32 is connected, the low speed clutch 31 and high speed clutch 14 are both disconnected.

In the case of the above structured continuously variable transmission apparatus, firstly, during the low speed running operation, the low speed clutch 31 is connected and, at the same time, the high speed clutch 14 and reversing clutch 32 are disconnected respectively. In this state, in case where the start clutch 17 is connected and the input shaft 1*a* is rotated, only the toroidal-type continuously variable transmission 9 is allowed to transmit the power from the input shaft 1*a* to the output shaft 20. In such low speed running operation, the transmission ratios between respective pairs of input side disks 3, 3 and output side disks 5, 5 are adjusted similarly to the case previously shown in FIGS. 10 and 11 in which only the toroidal-type continuously variable transmission 9 is allowed to transmit the power.

On the other hand, in the high speed running operation, he high speed clutch 14 is connected and, at the same time, the connection of the low speed clutch 31 and reversing clutch 32 is cut off. In this state, in case where the start clutch 17 is connected and the input shaft 1a is rotated, the transmission shaft 13 and planetary gear mechanism 10 are allowed to transmit the power from the input shaft 1*a* to the output shaft 20. That is, in case where the input shaft 1*a* is rotated in the high speed running operation, the rotational power of the input shaft 1*a* is transmitted through the high speed clutch 14 and transmission shaft 13 to the ring gear 11. And, the rotational power of the ring gear 11 is transmitted through the plurality of planetary gear sets 23, 23 to the sun gear 21, thereby rotating the output shaft 20 to which the sun gear 21 is fixed. In, this state, in case where the transmission ratio of the toroidal-type continuously variable transmission 9 is changed to thereby vary the revolving speeds (the rotation speeds around the periphery of the sun gear 21) of the respective planetary gear sets 23, 23, the transmission ratio of the whole of the continuously variable transmission apparatus can be adjusted.

In other words, in case where the input shaft 1*a* is rotated in the high speed running operation, the rotational power of the input shaft 1*a* is transmitted through the transmission shaft 13 and support plate 12 to the ring gear 11, thereby rotating the ring gear 11. And, the rotational power of the ring gear 11 is then transmitted through the plurality of planetary gear sets 23, 23 to the sun gear 21, thereby rotating the output shaft 20 to which the sun gear 21 is fixed. When the ring gear 11 serves as the input side, assuming that the respective planetary gear sets 23, 23 are not rotating (that is, they are not revolving around the periphery of the sun gear 21), the planetary gear mechanism 10 increases the revolving speed between the input shaft 1a and the output shaft 20 by the transmission ratio that corresponds to the ratio of the numbers of the ring gear 11 and sun gear 21. However, the respective planetary gear sets 23, 23 actually rotate around the periphery of the sun gear 21, while the transmission ratio of the whole of the continuously variable transmission apparatus varies according to the speed of the rotation (around the periphery of the sun gear 21) of the respective planetary gear sets 23, 23. Thus, in case where the transmission ratio of the toroidal-type continuously variable transmission 9 is changed to thereby change the revolving speed (the rotation speed around the periphery of the sun gear 21) of the respective-planetary gear sets 23, 23, the transmission ratio of the whole of the continuously variable transmission apparatus can be adjusted.

That is, in the above-mentioned high speed running operation, the respective planetary gear sets 23, 23 rotate around the periphery of the sun gear 21 in the same direction of the ring gear 11. And, the slower the rotation speed (around the periphery of the sun gear 21) of the respective planetary gear sets 23, 23 is, the faster the rotation speed of the output gear 20 with the sun gear 21 fixed thereto is. For example, in case where the rotation speed (around the periphery of the sun gear 21) of the respective planetary gear sets 23, 23 is equal to the rotation speed of the ring gear 11 (both of which are angular speeds), the rotation speed of the ring gear, 11 is equal to that of the output shaft 20. On the other hand, in case where the rotation speed (around the periphery of the sun gear 21) of the respective planetary gear sets 23, 23 is faster than the rotation speed of the ring gear 11, the rotation speed of the output shaft 20 is slower than that of the ring gear 11.

Therefore, in the high speed running operation, as the transmission ratio of the toroidal-type continuously variable transmission 9 is changed toward the speed reducing side, the transmission ratio of the whole of the continuously variable transmission apparatus is changed toward the speed increasing side. In the state of such high speed running operation, to the toroidal-type continuously variable transmission 9, there is applied torque not from the input side disk 3 but from the output side disk 5 (that is, assuming that torque to be applied in the low speed running operation is positive, negative torque is applied). In other words, in a state where the high speed clutch 14 is connected, the torque, which has been transmitted from the engine 15 to the input shaft 1a, is then transmitted through the transmission shaft 13 to the ring gear 11 of the planetary gear mechanism 10. Therefore, there remains little torque that is to be transmitted from the input shaft 1a side to the input side disks 3, 3 constituting the toroidal-type continuously variable transmission 9.

On the other hand, part of the torque transmitted through the transmission shaft 13 to the ring gear 11 is transmitted from the respective planetary gear sets 23, 23 to the respective output side disks 5, 5 through the carrier 24 and first power transmission mechanism 25. The torque to be applied from the output side disks 5, 5 to the toroidal-type continuously variable transmission 9 reduces as the transmission ratio of the toroidal-type continuously variable transmission 9 is varied toward the speed reducing side in order to change the whole of the continuously variable transmission apparatus toward the speed increasing side. As a result of this, in the high speed running operation, by reducing the torque to be input to the toroidal-type continuously variable transmission 9, the durability of the composing parts of the toroidal-type continuously variable transmission 9 can be enhanced.

Further, when rotating the output shaft 20 reversely so as to back the vehicle, the low speed and high speed clutches 31, 14 are disconnected and, at the same time, the reversing clutch 32 is connected. As a result of this, the ring gear 11 is fixed; and, the planetary gear sets 23, 23, while they are being in meshing engagement with the ring gear 11 and sun gear 21, are rotated around the periphery of the sun gear 21. And, the sun gear 21 and output shaft 20 with the sun gear 21 fixed thereto are rotated in the opposite direction to the above-mentioned low speed and high speed running operations.

Next, FIGS. 13 and 14 show a more concrete example of the continuously variable transmission apparatus shown in the above-mentioned FIG. 12. By the way, the inventors have conducted a series of tests to be discussed below using the continuously variable transmission apparatus shown in FIGS. 13 and 14, which have-conducted us to development of the present invention. The present continuously variable transmission apparatus comprises an input shaft 1b, an output shaft 20a, a toroidal-type continuously variable transmission 9a, a planetary gear mechanism 10a, a first power transmission mechanism 25a, and a transmission shaft 13a constituting a second-power transmission mechanism. Of the above composing parts, the input shaft 1b is connected to a drive source such as an engine 15 (see FIG. 12) and can be driven or rotated by the drive source. Also, the output shaft 20a, which is used to take out the power based on the rotational movement of the input shaft 1b, is connected through a differential gear (not shown) to a wheel drive shaft.

Also, the toroidal-type continuously variable transmission 9a is of a double cavity type and includes trunnions 7, 7 and power rollers 4, 4 each by threes in each of the two cavities, that is, a total of six trunnions 7 and power rollers 4. In order to construct such toroidal-type continuously variable transmission 9a, a pair of input side disks 3, 3 are respectively supported on the two end portions of the input shaft 1b in such a manner that they can be rotated in synchronization with the input shaft 1b and the respective inner surfaces 3a, 3a of the pair of input side disks 3, 3 are disposed -opposed to each other. Of the two input side disks 3, 3, the input side disk 3 situated on the base end side (that is, on the drive source side; and, in FIG. 13, on the left side) of the input shaft 1b is supported on the input shaft 1b through a ball spline 33 in such a manner that it can be shifted in the axial direction of the input shaft 1b. On the other hand, the input side disk 3 on the leading end side (that is, on the side far from the drive source; and, in FIG. 13, on the right side) of the input shaft 1b is fixed to the input shaft 1b in such a manner that the back surface of the input side disk 3 is held by a loading nut 34 while the input side disk 3 is spline engaged with the leading end portion of the input shaft 1b.

And, on the portions of the peripheries of the middle portions of the input shaft 1b that exist between the pair of input side disks 3, 3, there are disposed a pair of output side disks 5, 5 in such a manner that the inner surfaces 5a, 5a of the output side disks 5, 5 are respectively opposed to the inner surfaces 3a, 3a of the input side disks 3, 3 and the output side disks 5, 5 can be respectively rotated in synchronization with their associated input side disks 3, 3. And, the power rollers 4, 4, which are rotatably supported on the inner surfaces of their associated trunnions 7, 7, are held by and between the inner surfaces 3a, 3a of the input side disks 3, 3 and the inner surfaces 5a, 5a of the output side disks 5, 5.

In order to support these trunnions 7, 7, a frame 37 is connected and fixed to a mounting portion 36 formed in the inner surface of a casing 35 by three studs 39, 39 respectively inserted through their associated mounting holes 38, 38 formed at three positions in the outside diameter side end portion of the frame 37 and three nuts 40, 40 respectively threadedly engaged with their associated studs 39, 39. In the illustrated example, a gear housing 41 is fixed between the mounting portion 36 and frame 37 by these studs 39, 39 and nuts 40, 40. On the inside diameter side of the gear housing 41, an output sleeve 42 with the two end portions thereof unevenly (projectingly and recessedly) engaged with the pair of output side disks 5, 5 is rotatably supported by a pair of rolling bearings 43, 43; and, an output gear 44 disposed on the outer peripheral surface of the middle portion of the output sleeve 42 is stored in the interior of the gear housing 41.

Also, the frame 37 is formed in a star shape as a whole, while the diameter-direction middle portion or outside diameter side portion of the frame 37 is forked to thereby provide three hold portions 45, 45 at regular intervals in the circumferential direction of the frame 37. And, the middle portions of three support pieces 46, 46 are respectively pivotally supported on the diameter-direction middle portions of their associated hold portions 45, 45 by their associated second pivot shafts 47, 47. Each of the three support pieces 46, 46 is composed of a cylinder-shaped mounting portion 48 to be disposed on the periphery of its associated one of the second pivot shafts 47, 47, and a pair of support plate portions 49, 49 which are respectively provided on and projected from the outer peripheral surface of the mounting portion 48 outwardly in the diameter direction. An angle of intersection between the pair of support plate portions 49, 49 is set an angle of 120°. Therefore, the support plate portions 49, 49, which adjoin each other in the circumferential direction of the frame 37, are parallel to each other.

In these support plate portions 49, 49, there are formed circular holes 50, 50, respectively. When the support-pieces 46, 46, are respectively held at their neutral positions, the circular holes 50, 50, which are formed in the support plate portions 49, 49 of the support pieces 46, 46 adjoining each other in the circumferential direction of the frame 37, are concentric with each other. And, pivot shafts 8, 8, which are respectively disposed on the two end portions of each of the trunnions 7, 7, are respectively supported within their associated circular holes 50, 50 by their associated radial needle roller bearings 51, 51. The outer peripheral surfaces of outer rings 52, 52, which respectively constitute their associated radial needle roller bearings 51, 51, are respectively formed as a spherical-shaped convex surface. The outer rings 52, 52 are respectively inserted into their associated circular holes 50, 50 in such a manner that they can be prevented against shaky motion and can be swingly shifted. Also, in the support plate portions 49, 49, there are formed screw holes 53, 53 respectively; and the spherically-convex-surface-shaped leading end faces of studs 54, 54 threadedly engaged into the screw holes 53, 53 are respectively butted against the two end faces of the respective trunnions 7, 7. Thanks to this structure, the shift amounts of the respective trunnions 7, 7 with respect to the circumferential direction with the input shaft 1b as the center thereof can be mechanically synchronized with each other.

On the inner surfaces of the trunnions 7, 7 supported in the interior of the casing 35 in the above-mentioned manner, there are supported their associated power rollers 4, 4 through shift shafts 55 structured such that the base half portions and front half portions thereof are formed eccentric to each other. Also, between the outer end faces of the power rollers 4, 4 and the inner surfaces of the trunnions 7, 7, there are respectively interposed thrust ball bearings 56 and thrust needle roller bearings 57 in the order starting from the power roller 4 side. Of these bearings, the thrust ball bearings 56 not only support thrust loads to be applied to the power rollers 4 but also allow the power rollers 4 to rotate. On the other hand, in the case of the thrust needle roller bearings 57, in case where the composing parts of the toroidal-type continuously variable transmission 9a are elastically deformed when the toroidal-type continuously variable transmission 9a is in operation and thus the shift shafts 55 are swung about their respective base half portions to cause the power rollers 4 to shift in the axial direction of the input shaft 1b, the thrust needle roller bearings 57 allow such shifting motion of the power rollers 4 to be executed smoothly.

The peripheral surfaces 4a, 4a of the power rollers 4, 4 supported on the inner surfaces of the trunnions 7, 7 in the above-mentioned manner are contacted with the inner surfaces 3a, 3a of the input side and output side disks 3, 5. Also, an oil pressure type of pressing device 18a is assembled between the input shaft 1b and the input side disk 3 on the base end side of the input shaft 1b to thereby secure the surface pressure of the contact portions (traction portions) between the respective surfaces 4a, 3a, 5a, so that the power transmission by the toroidal-type continuously variable transmission 9a can be carried out with high efficiency.

In order to construct the pressing device 18a, an outwardly facing flange portion 58 is fixedly disposed on the near-to-base-end portion of the outer peripheral surface of the input shaft 1b and, at the same time, a cylinder 59 is oiltight fitted with and supported by the outer surface of the above-mentioned base-end-side input side disk 3 in such a manner it projects axially from the outer surface (in FIG. 13, the left surface) of the present input side disk 3. The inside diameter of the cylinder 59 is small in the axial-direction middle portion thereof and large in the two end portions thereof; and, the present input side disk 3 is oiltight fitted with the inner surface of the large-diameter portion of the leading end side of the cylinder 59 in such a manner that it can be shifted in the axial direction. Also, in the inner peripheral surface of the middle portion of the cylinder 59, there is formed an inwardly-facing-flange-shaped partition plate portion 60. Further, between the inner peripheral surface of the cylinder 59 and the outer peripheral surface of the input shaft 1b, there is interposed a first piston member 61.

The first piston member 61 includes an outwardly-facing-flange-shaped partition plate 63 formed on the outer peripheral surface of the middle portion of a support tube portion 62 which can be fitted with the outer surface of the input shaft 1b; and, the outer peripheral edge of the partition plate 63 is oiltight slidingly contacted with the small-diameter portion of the inner peripheral surface of the cylinder 59 in such a manner that it can be shifted in the axial direction. Also, in this state, the inner peripheral edge of partition plate portion 60 is oiltight slidingly contacted with the outer peripheral surface of the support tube portion 62 in such a manner that it can be shifted in the axial direction. Further, between the outer peripheral surface of the base end portion of the support tube portion 62 and the inner peripheral surface of the base end portion of the cylinder 59, there is interposed a circular-ring-shaped second piston member 64. The second piston member 64, when the base-end-side side surface thereof is contacted with the flange portion 58, can be prevented from shifting in the axial direction and, at the same time, can keep oiltight between the inner and outer peripheral edges thereof, the base end portion outer peripheral surface of the support tube portion 62 and the base end portion inner peripheral surface of the cylinder 59.

Also, the cylinder 59 including the partition plate portion 60 is pressed toward the input side disk 3 by a preload spring such as a countersunk plate spring 65 which is interposed between the partition plate portion 60 and second piston member 64. Therefore, the present-input side disk 3 is pressed at least (that is, even in a state where pressure oil is not introduced in the interior of the pressing device 18a) by a pressing force corresponding to the elasticity of the countersunk spring 65, so that the input side disk 3 applies the surface pressure corresponding to such elasticity to the contact portions between the respective surfaces 4a, 3a, 5a. In this case, this elasticity is restricted to such a degree that, when a very small level of power is transmitted by the toroidal-type continuously variable transmission 9a, slippage (excluding spin which is unavoidable) can be prevented from occurring in the respective contact portions between the respective surfaces 4a, 3a, 5a.

Also, the oil pressure can be introduced through a center hole 66 formed in the input shaft 1b into oil pressure chambers respectively existing between the second piston member 64 and partition plate portion 60 as well as between the partition wall plate 63 and input side disk 3. This center hole 66 communicates through an oil control valve (not shown) with an oil pressure source such as a pressurizing pump (not shown) When the continuously variable transmission apparatus including the toroidal-type continuously variable transmission 9a is in operation, the oil pressure, which is adjusted by the oil pressure control valve in accordance with the size of the power to be transmitted, is introduced into the respective oil pressure chambers to thereby press the input side disk 3, so that the surface pressure corresponding to the size of the above power is applied to the respective contact portions between the respective surfaces 4a, 3a, 5a.

Also, transmission of the rotational power to the input shaft 1b from a drive shaft 67 communicating with a drive source such as an engine is carried out through the flange portion 58. For this purpose, at a plurality of portions in the outer peripheral edge portion of the flange portion 58, there are formed notches 68, 68; and, these notches 68, 68 are respectively engaged with driving projecting portions 69, 69 formed in the end portion of the drive shaft 67. Also, for the above purpose, in the case of the present apparatus, an outwardly-facing-flange-shaped connecting portion 70 is formed in the end portion of the drive shaft 67, while the driving projecting portions 69, 69 are formed in the near-to-outside-diameter end portion of one surface of the connecting portion 70.

Further, actuators 71a, 71b each of an oil pressure type are attached to the respective trunnions 7, 7 so that the trunnions 7, 7 can be driven or shifted in the axial directions of their associated pivot shaft 8, 8 respectively disposed on the two end portions of each of the trunnions 7. Of the trunnions 7, the trunnion 7 disposed in the central portion of the lower side of FIG. 14 can be driven or shifted through lever arms 72, 72 in the axial directions of the pivot shafts 8, 8 disposed on the two end portions thereof by a pair of actuators 71a, 71a which are each of a single action type (that is, a type which is capable of obtaining only the push-out direction force) and the pressing directions of which are opposite to each other. When shifting each of the present trunnion 7, the pressure oil is fed only into the oil pressure chamber of one of the actuators 71a, whereas the oil pressure chamber of the other actuator 71a is set free. On the other hand, trunnions 7, 7 disposed on the two sides of the upper portion of FIG. 14 can be driven or shifted in the axial directions of the pivot shafts 8, 8 disposed on the two end portions of the trunnions 7, 7 by actuators 71b, 71b each of a double action type (a type which is capable of obtaining the push-out direction force or the pull-in direction force in accordance with switching of the supply direction of the pressure oil).

A total of six trunnions 7, 7, which are disposed in the toroidal-type continuously variable transmission 9a, may be shifted by the same length in synchronization with each other by supplying the same amount of pressure oil to the actuators 71a, 71b using a control valve. For this purpose, to the end portion of a rod 73 which can be shifted together with any one (in the illustrated example, in FIG. 14, the trunnion 7 on the upper left side) of the trunnions 7, there is fixed a precess cam 74 and the attitude of this trunnion 7 can be transmitted through a link arm 75 to a spool 76 of the above control valve.

The planetary gear mechanism 10a, which is combined with the above-structured toroidal-type continuously variable transmission 9a, comprises a sun gear 21a, a ring gear 11a, and planetary gear sets 23a, 23a. The sun gear 21a is fixed to the input side end portion (in FIG. 13, the left end portion) of the output shaft 20a. Therefore, the output shaft 20a can be rotated as the sun gear 21a is rotated. On the periphery of the sun gear 21a, there is supported the ring gear 11a in such a manner that it is concentric with the sun gear 21a and can be rotated. And, between the inner peripheral surface of the ring gear 11a and the outer peripheral surface of the sun gear 21a, there are interposed a plurality of planetary gear sets 23a, 23a each set consisting of a pair of planetary gears 22a, 22b combined together. Each pair of planetary gears 22a, 22b are meshingly engaged with each other, the planetary gear 22a disposed on the outside diameter side is meshingly engaged with the ring gear 11a, and the planetary gear 22b disposed on the inside diameter side is meshingly engaged with the sun gear 21a. The thus structured planetary gear sets 23a, 23a are rotatably supported on one side surface (in FIG. 13, the left side surface) of a carrier 24a. And, the carrier 24a is rotatably supported on the periphery of the middle portion of the output shaft 20a.

Also, the carrier 24a is connected to a pair of output disks 5, 5 structuring the toroidal-type continuously variable transmission 9a by the first power transmission mechanism 25a in such a manner that the rotational power can be transmitted between them. In order to constitute the first power transmission mechanism 25 at there is disposed a transmission shaft 26a which extends in parallel to the input shaft 1b and the output shaft 20a, and a gear 77 fixed to the one-end portion (in FIG. 13, the left end portion) of the transmission shaft 26a. Also, on the periphery of the middle portion of the output shaft 20a, there is disposed a sleeve 78 in such a manner that it can be rotated; and, a gear 79 supported on the outer peripheral surface of the sleeve 78 is meshingly engaged with a gear 80 fixedly secured to the other end portion (in FIG. 13, the right end portion) of the transmission shaft 26a through an idler gear (not shown). Further, on the periphery of the sleeve 78, there is supported the carrier 24a through a circular-ring-shaped connecting bracket 81 in such a manner that it can be rotated in synchronization with the sleeve 78. Therefore, as the output side disks 5, 5 are rotated, the carrier 24a can be rotated in the opposite direction to the output side disks 5, 5 at the speed that corresponds to the numbers of teeth of the respective gears 44, 77, 79, 80. Also, between the carrier 24a and output shaft 20a, there is interposed a low speed clutch 31a.

On the other hand, the input shaft $1b$ and ring gear $11a$ are connected to each other through the input side disk 3 supported on the leading end portion of the input shaft $1b$ and the transmission shaft $13a$ disposed concentrically with the input shaft $1b$ in such a manner that the rotational power can be transmitted between them. To attain this, a plurality of projecting portions 82, 82 are provided on and projected from the portion of the outer surface (in FIG. 13, the right side surface) of the present input side disk 3, that is, the half portion of the present outer surface that is situated nearer to the outside diameter of the input side disk 3 than the central portion of the present outer surface with respect to the diameter direction of the input side disk 3. In the case of the present example, these projecting portions 82, 82 are respectively formed in an arc shape and are arranged intermittently and at regular intervals on the same arc with the axis of the input side disk 3 as the center thereof. And, the portions, which exist between the circumferential-direction end faces of the projecting portions 82, 82 adjoining each other in the circumferential direction of the input side disk 3, are formed as securing notches 83, 83.

On the other hand, on the base end portion of the transmission shaft $13a$, there is disposed a transmission flange 85 through a conically-cylindrical-shaped transmission cylinder portion 84. And, in the buter peripheral edge portion of the transmission flange 85, there are disposed the same number of transmission projecting pieces 86, 86 as the number of securing notches 83, 83 at regular intervals with respect to the circumferential direction of the transmission flange 85. And, the transmission projecting pieces 86, 86 are respectively engaged with their associated securing notches 83, 83, thereby allowing torque to be transmitted between the input side disk 3 and transmission shaft $13a$. Since the diameter of the mutually engaged portions between the transmission projecting pieces 86, 86 and securing notches 83, 83 is sufficiently large, sufficiently large torque can be transmitted between the input side disk 3 and transmission shaft $13a$.

By the way, in order that the torque to be transmitted between the input side disk 3 and transmission shaft $13a$ can be increased as much as possible, preferably, the projecting portions 82, 82 may be provided on the near-to-outside-diameter end portion (outer peripheral edge portion) of the outer surface of the input side disk 3. However, in the case of the present example, in order to secure the finishing precision of the inner surface $3a$ of the input side disk 3, a flat portion 87 is formed in such portion of the outer surface of the input side disk 3 that is situated nearer to the outside diameter of the input side disk 3 than the projecting portions 82, 82, so that, when finishing the inner surface $3a$ of the input side disk 3, the near-to-outside-diameter portion of the outer surface of the input side disk 3 can be supported using the flat portion 87. Also, the transmission projecting pieces 86, 86 are formed such that they can be engaged into their associated securing notches 83, 83 with no shaky motion between them.

Also, the leading end portion (in FIG. 13, the right end portion) of the transmission shaft $13a$ is rotatably supported on the center portion of the sun gear $21a$. Further, the ring gear $11a$ is supported on the periphery of the middle portion of the transmission shaft $13a$ through a circular-ring-shaped connecting bracket 88 spline engaged with the transmission shaft $13a$ and through a high speed clutch $14a$ (which will be discussed later) in such a manner that the ring gear $11a$ can be rotated in synchronization with the transmission shaft $13a$. Therefore, while the high speed clutch 14 is connected, as the input shaft $1b$ is rotated, the ring gear $11a$ can be rotated together with the input shaft $1b$ in the same direction and at the same speed as the input shaft $1b$.

Further, between the ring gear $11a$ and the fixed-portion of the casing 35 such as a fixed wall 89 formed within the casing 35, there is interposed a reversing clutch $32a$. The reversing clutch $32a$, high speed clutch $14a$ and low speed clutch $31a$ are all wet-type multiple disk clutches each comprising a plurality of friction plates and a plurality of separate plates which are arranged alternately. These clutches $32a$, $14a$ and $31a$ can be respectively connected or disconnected in accordance as the pressure oil is supplied into a high speed oil pressure cylinder 90, a low speed oil pressure cylinder 91, and a reversing oil pressure cylinder 92 which are respectively attached to the clutches $32a$, $14a$ and $31a$. Also, in case where any one of these clutches is connected, the connection of the remaining two clutches is cut off. By the way, while the clutches $32a$, $14a$ and $31a$ are equal in the effective radius to each other, the friction plates and separate plates are different in number from each other. That is, the number of the plates constituting the low speed clutch $31a$ required to transmit the largest torque is set the largest (for example, eight plates each); and, the number of the plates constituting the reversing clutch $32a$ and high speed clutch $31a$ required to transmit relatively small torque is set smaller (for example, five plates each) than the number of the plates constituting the low speed clutch $31a$.

The above-structured continuously variable transmission apparatus is similar in operation to the conventional structure shown in the previously discussed FIG. 12. That is, firstly, in the low speed running operation (low speed mode), the oil pressure is introduced into the low speed oil pressure cylinder 91 to thereby connect the low speed clutch $31a$ and, at the same time, oil pressures existing within the high speed and reversing oil pressure cylinders 90, 92 are discharged therefrom to thereby cut off the connection of the high speed clutch $14a$ and reversing clutch $32a$.

Also, in the high speed running operation (high speed mode), the oil pressure is introduced into the high speed oil pressure cylinder 90 to thereby connect the high speed clutch $14a$ and, at the same time, oil pressures within the low speed and reversing oil pressure cylinders 91, 92 are discharged therefrom to thereby cut off the connection of the low speed clutch $31a$ and reversing clutch $32a$. In this state, in case where the input shaft $1b$ is rotated, the transmission shaft $13a$ serving as the second power transmission mechanism and the planetary gear mechanism $10a$ transmit the rotational power from the input shaft $1b$ to the output shaft $20a$. In this state, by changing the transmission ratio of the toroidal-type continuously variable transmission $9a$ to thereby change the revolving speeds (around the sun gear $21a$) of the respective planetary gear sets $23a$, $23a$, the transmission ratio of the whole of the continuously variable transmission apparatus can be adjusted.

Further, when reversing the output shaft $20a$ in order to back the vehicle, the oil pressures within the low speed and high speed-oil pressure cylinders 90, 91 are discharged therefrom to thereby cut off the connection of the low speed and high speed clutches $31a$, $14a$ and, at the same time, the oil pressure is introduced into the reversing oil pressure cylinder 92 to thereby connect the reversing clutch $32a$. In this state, the sun gear $21a$ and the output shaft $20a$ fixed to the sun gear $21a$ are rotated in the opposite direction to the direction in the previously described low speed and high speed running operations.

In the case of the conventional continuously variable transmission apparatus structured and operated in the above-mentioned manner, according to a study made by the present inventors, it has been found that, in switching the low speed and high speed modes over to each other, the number of revolutions of the engine can vary suddenly to thereby raise a possibility of giving a driver an incongruous feeling. Also, according to the study made by the present inventors, it has also been found that such sudden variation in the number of revolutions of the engine is caused by the following facts: that is, in the above mode switching time, there exists a moment when the connection of the low speed and high speed clutches 31a, 14a (of course, the connection of the reversing clutch 32a as well) is cut off; and, the low speed and high speed clutches 31a, 14a are different in capacity from each other.

Now, description will be given below of this point with reference to FIGS. 15 to 17 in addition to FIG. 13.

Of the above figures, FIG. 15 shows an apparatus used in a test which was conducted to know not only the timing for signaling for instructing the connection or disconnection of the low speed and high speed clutches 31a, 14a (in FIGS. 15, 31, 14) but also the connecting states of these two clutches 31a, 14a based on this signal. The present apparatus, using the continuously variable transmission apparatus previously shown in FIGS. 13 and 14, is used to find not only the timing for issuance of the signal for instructing the connection or disconnection of the high speed and low speed clutches 14a, 31a, but also the timing at which these two clutches 14a, 31a are actually connected and disconnected.

By the way, the timing for connection and disconnection of the two clutches 14a, 31a was judged according to the oil pressures of the high speed and low speed oil pressure cylinders 90, 91 which are respectively attached to the two clutches 14a, 31a. That is, in case where the oil pressures of the high speed and low speed oil pressure cylinders 90, 91 attached to the two clutches 14a, 31a are low, it was judged that pressing pistons respectively disposed within these cylinders are movable, there exist gaps respectively between the friction plates and separate plates constituting these clutches, and the connection of the present clutches is cut off. On the other hand, in case where the oil pressures of the high speed and low speed oil pressure cylinders 90, 91 attached to the two clutches 14a, 31a are sufficiently high, it was judged that pressing pistons respectively disposed within these cylinders cannot be moved, the friction plates and separate plates constituting these clutches are contacted with each other, and the present clutches are connected. Further, in case where the oil pressures of the high speed and low speed oil pressure cylinders 90, 91 attached to the two clutches 14a, 31a are intermediate values, it was judged that the present clutches are held in a so called clutch slipping state in which they transmit the rotational power while slipping.

Firstly, description will be given below of the test apparatus shown in FIG. 15 that is structured based on the structure of an actually used continuously variable transmission apparatus. By the way, a toroidal-type continuously variable transmission 9 and a planetary gear mechanism 10 shown in FIG. 15 are similar to those previously shown in FIG. 12; and, a first power transmission mechanism 25 is also structured such that sprockets 27a, 27b and a chain 28 are incorporated therein. With regard to reference characters, there are used the same reference characters as in FIG. 12 and thus the description thereof is omitted here. By the way, although there is shown a start clutch 17 in FIG. 15, in the case of an actual test apparatus, this start clutch 17 is omitted; and, a drive source and the input shaft 1a of the toroidal-type continuously variable transmission 9 are connected directly to each other. While a reversing clutch 32 is disposed, an oil pressure pipe is omitted; and, therefore, this reversing clutch 32 does not function.

As pressure oil for connecting together the high speed and low speed clutches 14, 31, there is used pressure oil which is sucked out from an oil tank 93 (in actual assembly to a vehicle, an oil pan) and is then jetted out from a pressurizing pump 94. Between the pressurizing pump 94 and the above-mentioned high speed clutch 14 {specifically, the high speed oil pressure cylinder 90 (FIG. 13) for connecting and disconnecting the high speed clutch 14}, there is interposed a high speed side switch valve 95; and, similarly, between the pressurizing pump 94 and the above-mentioned low speed clutch 31 {specifically, the low speed oil pressure cylinder 91 (FIG. 13) for connecting and disconnecting the low speed clutch 31}, there is interposed a low speed side switch valve 96. These switch valves 95 and 96 respectively turn on/off solenoids attached thereto in accordance with a signal from a controller 97 to thereby switch the following two modes over to each other: that is, one mode in which the oil tanks 14, 31 are allowed to communicate with the jet-out port of the pressurizing pump 94; and, the other mode in which the oil tanks 14, 31 are allowed to communicate with the oil tank 93. Also, on such portions of the oil pressure pipe that exist between the switch valves 95, 96 and clutches 14, 31, there are mounted high speed side and low speed side pressure gauges 98, 99 respectively, so that the oil pressures of the clutches 14, 31 (specifically, the high speed and low speed oil pressure cylinders 90, 91 for connecting and disconnecting the clutches 14, 31) can be measured.

The present inventors, using the above-structured test apparatus, measured not only the timing at which a signal for switching the high speed side and low speed side switch valves 95, 96 is issued by the controller 97 but also the timing at which the high speed and low speed clutches 14, 31 are actually connected. The results of the measurement are shown in FIGS. 16A to 17B. FIGS. 16A to 17B respectively show not only variations in an instruction signal given to the high speed and low speed clutches 14, 31 in the switching time of the low speed and high speed modes but also variations in the connecting states of the two clutches 31, 14. Also, of the two FIGS. 16A to 17B, FIGS. 16A and 16B show the variations which occur when switching the low speed mode over to the high speed mode, while FIGS. 17A and 17B show the variations occurring when switching the high speed mode over to the low speed mode.

Also, the horizontal axes of FIGS. 16A to 17B express the elapsed time; and, the vertical axes of FIGS. 16A and 17A express the above-mentioned instruction signals, whereas the vertical axes of FIGS. 16B and 17B express the connecting states of the clutches. By the way, these instruction signals are instruction signals which are transmitted from the controller 97 to solenoids attached to the respective switch valves 96, 95 in order to control the supply of the pressure oil to the low speed and high speed oil pressure cylinders 91, 90 for connecting and disconnecting the clutches 31, 14; and, the vertical axes of FIGS. 16A and 17A show the voltages of these instruction signals. In case where these voltage are positive, the clutches are connected, and, in case where they are negative, the connection of the clutches is cut off. Also, the connecting states of the clutches are expressed by the measured values of the pressure gauges 99, 98 that are proportional to the contact pressure ratio between the friction plates and separate plates constituting the two clutches 31, 14.

Further, solid lines shown in FIGS. 16A to 17B express the above-mentioned variations with respect to the low speed clutch 31, whereas broken lines express the variations with respect to the high speed clutch 14, respectively.

In the test, when switching the low speed mode and high speed mode over to each other, in both of switching directions, the instruction signals to be applied to the switch valves 96, 95, as shown in FIGS. 16A and 17A, were switched within the time of about 0.2 sec. That is, in about 0.2 sec. after issuance of a signal for cutting off the connection of the currently connected clutch, there was issued a signal for connecting the currently disconnected clutch. As the results of the test conducted under these conditions, it has been found that, when switching the low speed mode and high speed mode over to each other, in case where the timings for issuance of the instruction signals are set the same regardless of the switching directions, a continuous time, during which neither of the clutches are not connected, increases.

That is, as can be seen obviously from FIGS. 16B and 17B, in the case of the clutch to which a signal for cutting off the connection thereof has been transmitted, the connection of the clutch is cut off in a very short time (see the solid line shown in FIG. 16B and the broken line shown in FIG. 17B). On the other hand, as can also be seen obviously from FIGS. 16B and 17B, in the case of the clutch to which a signal for connection has been transmitted, there is generated a slight time delay between reception of the signal and completion of the connection of the of the clutch. Also, as can be understood clearly from comparison between the broken line shown in FIG. 16B and the solid line shown in FIG. 17B, the degree of the time delay varies according to the mode switching directions.

Specifically, the time necessary for connection of the currently disconnected clutch (the time during which the clutch is held in the clutch-slipping state) is longer in the switching operation from the high speed mode to the low speed mode shown in FIG. 17B than in the switching operation from the low speed mode to the high speed mode shown in FIG. 16B.

The present inventors not only have studied the reason for generation of the slight time delay between reception of the connection signal by the clutch and completion of the actual connection of the clutch and the reason for the difference of the time delay according to the mode switching directions, but also have repeatedly conducted the test for confirmation of these reasons. Our study and confirmation test results have found the following facts.

Firstly, the time delay is caused by the fact that it takes some time to complete the full-stroke movements of the pistons incorporated in the high speed and low speed oil pressure cylinders 90, 91. That is, to connect together the friction plates and separate plates constituting the clutches 14, 31 in order to connect the clutches 14, 31, it is necessary to shift the respective friction and separate plates as well as the pressurizing pistons that are incorporated in the oil pressure cylinders 90, 91. This shifting operation is carried out by introducing pressure oil into the oil pressure cylinders 90, 91; however, due to resistance within the pipes used to introduce the pressure oil, it inevitably takes time to complete introduction of a sufficient quantity of pressure oil. This gives rise to the above-mentioned generation of the time delay.

Next the reason for the different degrees of the time delay according to the mode switching directions is that, between the high speed clutch 14 and low speed clutch 31, the strokes of the pressurizing pistons incorporated in the oil pressure cylinders 90, 91, which are necessary to shift the pressurizing pistons up to such positions as to allow completion of connection of the high speed clutch 14 and low speed clutch 31, are different.

That is, as described before, in the case of the low speed clutch 31 which is required to transmit large torque, the number of the plates is large; and, on the other hand, in the case of the high speed clutch 14 which is required to transmit relatively small torque, the number of the plates is small. As the number of the plates increases, the strokes of the pressurizing pistons incorporated in the oil pressure cylinders 90, 91, which are necessary to bring the disconnected clutches into connected states, increase. For this reason, as shown by the broken line in FIG. 16B and by the solid line in FIG. 17B, the time delay in the switching operation from the high speed mode to the low speed mode (the solid line in FIG. 17B) is larger than the time delay in the switching operation from the low speed mode to the high speed mode (the broken line in FIG. 16B).

During the above time delay, since the engine serving as the power source is not connected (or is imperfectly connected) to the drive wheel, the power cannot be transmitted from the engine to the drive wheel. To confirm the behavior that occurs in this case, the present inventors have conducted a test for switching the low speed mode and high speed mode over to each other using a test apparatus shown in FIG. 15. In this test, the rotation speed of an input shaft $1a$ is fixed to $200_{min}^{-1}$; and, any other rotary shaft was not connected to the end portion of an output shaft 20, while the output shaft 20 was set in such a manner that it can be rotated freely. Also, in a state where the input shaft $1a$ and output shaft 20 were the same in the speed (that is, the transmission ratio was 1), in order to switch the above two modes over to each other, the low speed clutch 31 and high speed clutch 14 were connected and disconnected. And, the present inventors measured variations in the rotation speed of the output shaft 20 occurring due to the switching of these two modes over to each other.

As a result of this test, not only in the switching operation from the low speed mode to the high speed mode but also in the switching operation from the high speed mode to the low speed mode, the rotation speed of the output shaft 20 was lowered down (to a value lower than $200_{min}^{-1}$). Specifically, however, in the switching operation from the low speed mode to the high speed mode, the rotation speed of the output shaft 20 was lowered only by $20_{min}^{-1}$ from $200_{min}^{-1}$ to $180_{min}^{-1}$; and, on other hand, in the switching operation from the high speed mode to the low speed mode, the rotation speed of the output shaft 20 was lowered no less than $80_{min}^{-1}$ from $200_{min}^{-1}$ to $120_{min}^{-1}$. And, in either case, as the clutch was connected after the above-mentioned time delay, the rotation speed of the output shaft 20 returned back to $200_{min}^{-1}$.

Since the above test was done in a state where the output shaft 20 can be rotated freely, in the mode switching operations, the rotation speed of the output shaft 20 was lowered. However, in an actual case, the output shaft 20 and the drive wheel are mechanically connected to each other through a propeller shaft and a differential gear. Therefore, in the mode switching operations, there is no possibility that the rotation speed of the output shaft 20 can be lowered but, in the clutch-slipping state, the rotation speed of the input shaft $1a$ increases. For this reason, in the mode switching operations, after the rotation speed of the engine serving as the drive source increases for an instant regardless of the operation of an accelerator pedal, the clutch is connected.

An increase in the rotation speed of the engine regardless of the operation of the accelerator pedal, even for an instant, is not preferable because it gives a driver an incongruous feeling. Also, in case where the clutch is connected after the rotation speed of the engine increases for an instant, there is a possibility that the whole of the power transmission system including the continuously variable transmission apparatus can be vibrated, which also gives the driver an incongruous feeling. There is a possibility that such incongruous feeling can increase especially in the switching operation from the high speed mode to the low speed mode.

The present invention aims at eliminating the above-mentioned drawbacks found in the conventional continuously variable transmission apparatus. Accordingly, it is an object of the present invention to provide a continuously variable transmission apparatus which can reduce the above-mentioned time delay at least in the switching operation from the high speed mode to the low speed mode.

Also, as another examples of a conventional toroidal-type continuously variable transmission, there are known toroidal-type continuously variable transmissions which are disclosed, for example, in JP-2734583 and JP-A-5-39850. In each of the toroidal-type continuously variable transmissions disclosed in these publications, between an input side disk and an output side disk, there are interposed a plurality of power rollers. The power rollers are respectively supported by their associated trunnions in such a manner that they can be swingly rotated. When changing the rotation speed between input and output shaft, the power rollers are swingly rotated to thereby change the rotation radius ratio of the contact point between the input side and output side disks.

In order to swing and rotate the power rollers, the trunnions are respectively moved by a desired amount in the axial directions of the respective trunnion shafts by their respective actuators including their respective oil pressure pistons to thereby offset the centers of rotation of the power rollers with respect to the centers of rotation of the input side and output side disks. In correspondence to the offset amounts of the trunnions, in the contact points between the input side and output side disks, there are generated moment forces which can swing and rotate the power rollers; and, due to such moment forces, the power rollers are swingly rotated at an angle which corresponds to the desired transmission ratio.

The above actuators move the trunnions in the axial direction thereof by the desired amount by driving their pistons using the pressure of oil which can be controlled by a transmission control valve. In order to stabilize the swingly rotational operations of the power rollers caused by the movements of the trunnions, for example, as disclosed in JP-A-11-294549, there is known a technique which feedbacks the transmission control valve the shift amounts of the trunnions (the sum totals of the swung-rotation-direction shift amounts of the trunnions and the swung rotation angular amounts of the trunnions) by a feedback mechanism using a precess cam.

When incorporating a toroidal-type continuously variable transmission into an actual vehicle, as disclosed in JP-A-10-196759, there is proposed a technique in which the toroidal-type continuously variable transmission is combined with a planetary gear mechanism. Here, FIG. 18 shows a continuously variable transmission apparatus which is referred to as a power split type of continuously variable transmission apparatus by the present inventors.

The present continuously variable transmission apparatus comprises a toroidal-type continuously variable transmission 102, a planetary gear mechanism 103, a first power transmission mechanism 104, and a second power transmission mechanism 105. The two kinds of power transmission mechanisms 104, 105 are input to any two of three elements (a sun gear, a carrier, and a ring gear) of the planetary gear mechanism 103, and the remaining one element is connected to an output shaft 106 of the continuously variable transmission apparatus, whereby a differential component between the two elements (for example, the ring gear and carrier) can be output to the output shaft 106.

In a low speed running mode, all of the power (torque) of an engine 107 is transmitted through a drive shaft 108, toroidal-type continuously variable transmission 102 and first power transmission mechanism 104 to the output shaft 106. On the other hand, in a high speed running mode, the power of the engine 107 is transmitted through the second power transmission mechanism 105 and planetary gear mechanism 103 to the output shaft 106, while part of the power is input from the planetary gear mechanism 103 to the output side disk of the toroidal-type continuously variable transmission 102.

The above arrangement can reduce the torque to be applied to the toroidal-type continuously variable transmission 102 in a vehicle high speed running operation, can enhance the durability of the respective parts that constitute the toroidal-type continuously variable transmission 102, and can enhance the torque transmission efficiency of the whole of the continuously variable transmission apparatus.

By the way, in JP-A-11-108147, there is proposed a technique in which the numbers of rotations of the two elements of the planetary gear mechanism are measured and, when the numbers of rotations are almost coincident with each other, the switching operation between the high speed and low speed modes is executed. Also, in JP-A-9-89072, there is disclosed a continuously variable transmission apparatus of a so called geared neutral type in which a toroidal-type continuously variable transmission is combined with a single planetary gear mechanisms. In the continuously variable transmission apparatus of a geared neutral type, in a low speed running operation, power is transmitted through the single planetary gear mechanism and toroidal-type continuously variable transmission; and, in a high speed running operation, the power is transmitted only through the toroidal-type continuously variable transmission. According to the continuously variable transmission apparatus of a geared neutral type, there can be obtained an advantage that, in case where, in a low-speed-side speed mode, the continuously variable transmission apparatus is controlled such that a differential component of the planetary gear mechanism provides zero rotation, there can be eliminated the need for provision of a start clutch.

However, in this type of continuously variable transmission apparatus comprising the toroidal-type continuously variable transmission and planetary gear mechanism combined together, in the mode switching operation, torque to be input to the toroidal-type continuously variable transmission varies greatly from positive to negative (or vice versa). For example, in the switching operation for switching the low speed mode over to the high speed mode, there is a possibility that the input torque can vary from +300 Nm to −240 Nm.

Now, FIG. 19 shows part of a power roller 4 and a trunnion 7a used in the toroidal-type continuously variable transmission 102. In case where a load is applied to the toroidal-type continuously variable transmission 102, there occurs a traction force in the axis X1 direction of the trunnion 7a. In case where the power roller 4 is shifted, for example, in a direction shown by an arrow mark M1 due to the traction force, a feedback mechanism operates in such a manner that it returns the power roller 4 in the opposite direction (a direction shown by an arrow mark M2).

In a radial needle roller bearing 124 for supporting the power roller 4 and in a radial needle roller bearing 125 for supporting a shift shaft 55, inevitably, there exist gaps. Therefore, in case where a load is applied to the toroidal-type continuously variable transmission 102 due to the above-mentioned traction force, the power roller 4 is moved in the axis X1 direction by the sum total amount of these gaps.

Since the power roller 4 is moved in the axis X1 direction for the above reason, the load is applied while the transmission ratio of the toroidal-type continuously variable transmission 102 is left fixed, that is, without issuing a transmission instruction. In other words, in case where the input torque is caused to vary from 0 Nm, as shown in FIG. 20, as the input torque varies, the transmission ratio of the toroidal-type continuously variable transmission 102 is caused to vary, in spite of the fact that no transmission instruction has been issued. That is, the movement of the power roller 4 in the axis X1 direction causes side slippage between the power roller 4 and disk, which causes the power roller 4 to swing and rotate, thereby changing the transmission ratio of the toroidal-type continuously variable transmission 102.

In FIG. 20, the transmission ratio of the toroidal-type continuously variable transmission 102 varies greatly in the low torque area. The reason for this is that, in case where the power roller 4 is moved by the above-mentioned sum total of the gaps in the low torque area, the power roller 4 is caused to swing and rotate. FIG. 20 shows the results obtained from a test conducted under the conditions that the transmission ratio was set about 0.5, the number of rotations was set constant for about 2000, and the temperature of oil was set near to the actual temperature of a vehicle.

Now, description will be given below further of the phenomenon in which the transmission ratio varies mainly in the low torque area in the above-mentioned manner with references to FIGS. 21A, 21B and 22.

FIG. 21A shows a state of a trunnion in which a load applied to the trunnion is zero. In this case, a pair of power rollers respectively supported on their associated shift shafts 55 are both situated at their initial positions (that is, neutral positions); and, trunnions 7a, 7b, following the power rollers, are also situated at their respective initial positions which are (right and left) symmetric. Thus, the precess cam 74 of the feedback mechanism is also held at its given initial position.

FIGS. 21B shows a state of a trunnion in a light load area in which input of the torque is started. In the light load area, since the traction force acts, the power rollers and trunnions 7a, 7b are moved in the axial direction X1 by an amount corresponding to the above-mentioned gaps. Also, because the shift shafts 55 supporting the power rollers are respectively held like cantilevered beams, the flexing amounts of the shift shafts 55 are also included in the moving amounts of the trunnions 7a, 7b.

In case where the power rollers are moved in the axis X1 direction in the above manner, there is caused side slippage between the disk and power rollers and, in response to this, the feedback mechanism operates, so that the power rollers are finally returned to their respective initial positions (neutral positions). During this operation, since the transmission control valve has not received any transmission instruction, the moving amount of the transmission control valve depends only on the load and thus the transmission control valve little moves. Therefore, the power rollers are swingly rotated by the amount corresponding to the moving amount of the precess cam in the axis X1 direction, and the swung rotational movements of the power rollers cause the transmission ratio to vary.

FIG. 22 shows a state of a high load area. In the high load area, since the shift shafts 55 are flexed, the trunnions 7a, 7b are moved further in the axis X1 direction. However, in the toroidal-type continuously variable transmission of a traction drive type, since the traction force is generated by pressing the disk against the power rollers, due to such pressing force, the trunnions 7a, 7b are elastically deformed in such a manner as shown in FIG. 22 in an exaggerated manner.

With the elastic deformation of the trunnions 7a, 7b, the support portions J1, J2 of each of the trunnions 7a, 7b move in the direction (axis X1 direction) where they approach each other. Because the moving direction of the support portion J2 is opposite to the moving direction of the trunnion 7a caused by the existence of the above-mentioned gap, the moving amounts of these two elements cancel each other. As a result of this, the moving amount of the precess cam 74 in the axis X1 direction is slight. For these reasons, in the high load area, there hardly occurs such swung rotation of the power roller (that is, the variation of the transmission ratio) as occurring in the low load area.

Also, there can also be found a phenomenon in which, with a load applied to the toroidal-type continuously variable transmission, the trunnions 7a, 7b are elastically deformed and trunnion shafts 119 are flexed, so that the transmission ratio of the toroidal-type continuously variable transmission. In the toroidal-type continuously variable transmission of a traction drive type, it is necessary to press the disk against the power rollers and the pressing forces are supported by the trunnions 7a, 7b. The trunnions 7a, 7b, as one trunnion 7a is representatively shown in FIG. 19, are supported by a pair of support members 49, 49 which are referred to as yokes, whereby mutually-opposite-direction forces generated between the respective trunnions 7a are allowed to cancel each other. Due to this, each of the trunnions 7a is elastically deformed between the pair of support members 49, 49.

The trunnion shaft 119 itself is not deformed elastically because it does not receive the above pressing force; however, due to the influence of the above-mentioned elastic deformation caused between the support members 49, 49, the trunnion shaft 119 and rod 73 are swung. Due to this, the contact point between the precess cam 74 and the cam follower of the transmission control valve is caused to vary, so that the spool of the transmission control valve is moved in the axial direction.

As a result of this, the transmission control valve is operated to generate the oil pressure that moves the trunnions 7a, 7b in the axis X1 direction, thereby changing the transmission ratio of the toroidal-type continuously variable transmission. For example, in case where the precess cam 74 is moved in the axis X1 direction, the power roller is swingly rotated by an amount corresponding to the moving amount of the precess cam 74 according to the cam lead. For instance, in the case of the cam lead being 20 mm/360°, in case where the precess cam 74 moves by 0.3 mm in the axial direction X1, the power roller is swingly rotated no less than 5.4°.

In case where these factors are combined together, as shown in FIG. 23, although no transmission instruction is issued, as the torque varies, the transmission ratio of the toroidal-type continuously variable transmission is caused to vary. Accordingly, even in case where, as disclosed in the above-cited publication JP-A-11-108147, the clutch is connected when the number of rotations of the toroidal-type continuously variable transmission is coincident with the number of rotations of the planetary gear mechanism, as the torque varies, the transmission ratio of the toroidal-type continuously variable transmission is caused to vary greatly, thereby causing the number of rotations of the engine to vary.

By the way, in case where the driver judges the need for engine braking and takes his or her foot off the accelerator, similarly to the above case, although no transmission instruction is issued, the torque is caused to vary suddenly In this case as well, the transmission ratio of the toroidal-type continuously variable transmission is caused to vary. However, in this case, since the engine braking is used of the driver's will, the driver can forgive a certain degree of transmission shock caused by such variations in the transmission ratio of the toroidal-type continuously variable transmission.

However, in the continuously variable transmission apparatus of the above-mentioned power circulation type, even in case where the driver does not intend to switch the transmission mode, the mode is switched involuntarily. Therefore, in case where even a slight degree of transmission shock occurs in the mode switching operation, the drive feels incongruous. That is, as in the conventional the toroidal-type continuously variable transmission (FIG. 23), in case where, when no transmission instruction is issued in the mode switching operation, the transmission ratio varies greatly to thereby cause a transmission shock, the driver feels badly incongruous.

SUMMARY OF THE INVENTION

In view of the above-mentioned circumstances of the prior art, it is an object of the invention to provide a continuously variable transmission apparatus which can restrict the occurrence of a transmission shock in the mode switching operation.

In attaining the above object, according to a first aspect of the present invention, there is provided a continuously variable transmission apparatus comprising a toroidal-type continuously variable transmission, a planetary gear mechanism and a clutch device, the clutch device comprising: a low speed clutch connected in order to increase a speed reducing ratio and disconnected in order to decrease the speed reducing ratio; a high speed clutch connected in order to decrease the speed reducing ratio and disconnected in order to increase the speed reducing ratio; and, a controller for switching over the connected and disconnected states of the respective clutches to each other, the controller switching the transmission state of the continuously variable transmission apparatus into any one of a low speed mode and a high speed mode by connecting any one of the clutches, wherein timings for signaling by the controller for switching the connected and disconnected states of the clutches vary according to the switching directions of the low speed and high speed modes; and, a timing for signaling for connecting the low speed clutch with respect to the moment for signaling for cutting off the connection of the high speed clutch in order to switch the high speed mode over to the low speed mode is set earlier than a timing for signaling for connecting the high speed clutch with respect to the moment for signaling for cutting off the connection of the low speed clutch in order to switch the low speed mode over to the high speed mode.

According to a second aspect of the present invention, there is provided a continuously variable transmission apparatus, comprising: an input shaft connected to a drive source and rotationally driven by the drive source; an output shaft for taking out power obtained based on the rotational movement of the input shaft; a toroidal-type continuously variable transmission; a planetary gear mechanism, a first power transmission mechanism for transmitting power input to the input shaft through the toroidal-type continuously variable transmission; a second power transmission mechanism for transmitting power input to the input shaft without passing through the toroidal-type continuously variable transmission; a controller; the planetary gear mechanism, comprising: a sun gear; a ring gear disposed on the periphery of the sun gear; a planetary gear interposed between the sun gear and the ring gear so as to be meshingly engaged with the sun gear and the ring gear; and, a carrier for supporting the planetary gear so as to be rotated, wherein the power to be transmitted through the first power transmission mechanism and the power to be transmitted through the second power transmission mechanism are freely transmitted to two of the sun gear, the ring gear and the carrier, and the output shaft is connected to the remaining one of the sun gear, the ring gear and the carrier; and a mode switching mechanism for switching the state of the power input to the input shaft when the power is transmitted through the first and second power transmission mechanisms to the planetary gear mechanism, wherein the mode switching mechanism switches over first and second modes to each other, the first mode for transmitting the power by at least only the first power transmission mechanism, the second mode for transmitting the power by both of the first and second power transmission mechanisms, the controller connects only one of clutches constituting the mode switching mechanism to thereby set the transmission state of the continuously variable transmission apparatus into one of a low speed mode and a high speed mode, the low speed mode being one of the first and second modes, the high speed mode being the other of the first and second modes, and timings for signaling by the controller for switching the connection and disconnection of the clutches vary according to the switching directions of the low speed and high speed modes, a timing for signaling for connecting a low speed clutch to be connected when realizing the low speed mode with respect to the moment for signaling for cutting off the connection of a high speed clutch to be connected when realizing the high speed mode in order to switch over the high speed mode to the low speed mode is set earlier than a timing for signaling for connecting the high speed clutch with respect to the moment for signaling for cutting off the connection of the low speed clutch in order to switch over the low speed mode to the high speed mode.

According to a third aspect of the present invention, there is provided a continuously variable transmission apparatus, comprising: arm input shaft connected to a drive source and rotationally driven by the drive source; an output shaft for taking out power obtained based on the rotational movement of the input shaft; a toroidal-type continuously variable transmission including an input side disk, an output side disk, power rollers interposed between the input side and output side disks so as to be swingly rotatable, and trunnions for supporting the power rollers; a transmission control valve for shifting the trunnions; a feedback mechanism for transmitting the shift amounts of the trunnions to the transmission control valve for feedback so that a transmission ratio between the input and output disks provide a target value; a planetary gear mechanism including three elements, that is, a sun gear, a carrier and a ring gear; a first power transmission system for transmitting the power input to the input shaft to the output shaft through the toroidal-type continuously variable transmission; a second power transmission system for transmitting the power input to the input shaft to the output shaft without passing through the toroidal-type continuously variable transmission, the power to be transmitted through the first power transmission system and the power to be transmitted through the second power transmission system being joined to two of the three elements of the planetary gear mechanism, the remaining one of the three elements being connected to the output shaft; a clutch mechanism, when advancing a vehicle, for switching over a first mode on the low speed side and a second mode on the high speed side to each other; and, a control device, when switching over the first and second modes to each other, for controlling the transmission control valve simultaneously with the switching operation of the clutch mechanism within the time during which the clutch mechanism is switched, thereby restricting variations in the transmission ratio of the toroidal-type continuously variable transmission.

In the above construction, it is preferable that the control device, when the clutch mechanism is switched from the first mode on the low speed side to the second mode on the high speed side, starts the control of the transmission control valve later than the time when the switching operation of the clutch mechanism is started and completes the control of the transmission control valve at the time when the switching operation of the clutch mechanism is completed; and, when the second mode is switched over to the first mode, the control device starts the control of the transmission control valve at the time when the switching operation of the clutch mechanism is started and completes the control of the transmission control valve earlier than the time when the switching operation of the clutch mechanism is completed.

According to the above-structured continuously variable transmission apparatus of the present invention, the time delay in the mode switching operation from the high speed mode to the low speed mode can be reduced and an increase in the rotation speed of an engine in the mode switching operation can be restricted, thereby being able to reduce the degree of an incongruous feeling that is given to the driver.

That is, since, when switching the high speed mode over to the low speed mode, the timing for signaling for connecting the low speed clutch is set earlier than the timing for signaling for cutting off the connection of the high speed clutch, it is possible to reduce the time from the disconnection of the high speed clutch to the connection of the low speed clutch.

As a result of this, in the mode switching operation from the high speed mode to the low speed mode, there can be reduced the time during which the high speed and low speed clutches are both disconnected, which can reduce an increase in the number of rotations of the engine in the present mode switching operation and thus can reduce the degree of an incongruous feeling that is given to the driver.

DETAILED DESCRIPTION OF THE PREFERRED EMBODIMENTS

Figure 1A:
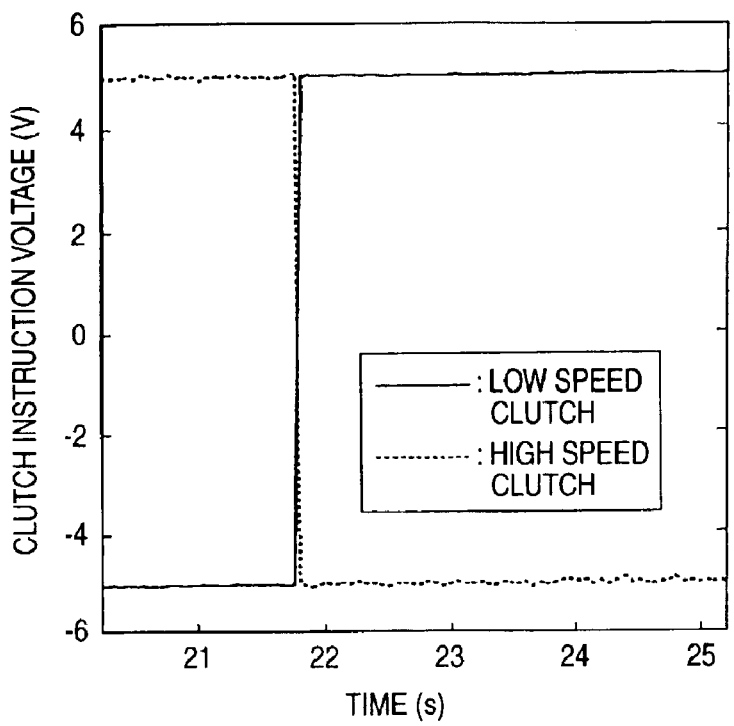
FIGS. 1A and 1B are diagrammatic views of a first embodiment of a continuously variable transmission apparatus according to the present invention, showing, according to the passage of time, instruction signals to be applied to low speed and high speed clutches and the connecting states of the respective clutches when the continuously variable transmission apparatus is switched from a high speed mode to a low speed mode.
Figure 1B:
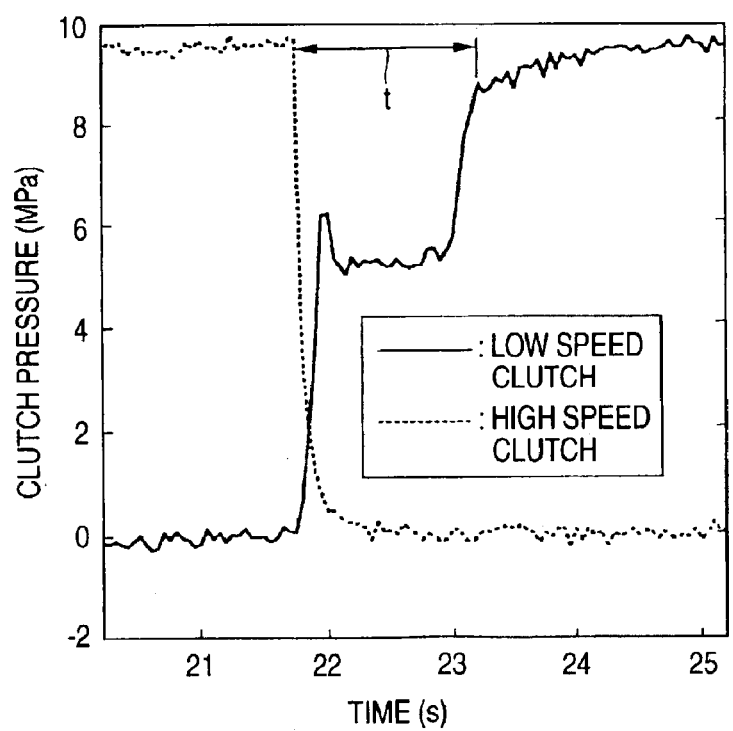
Figure 13:
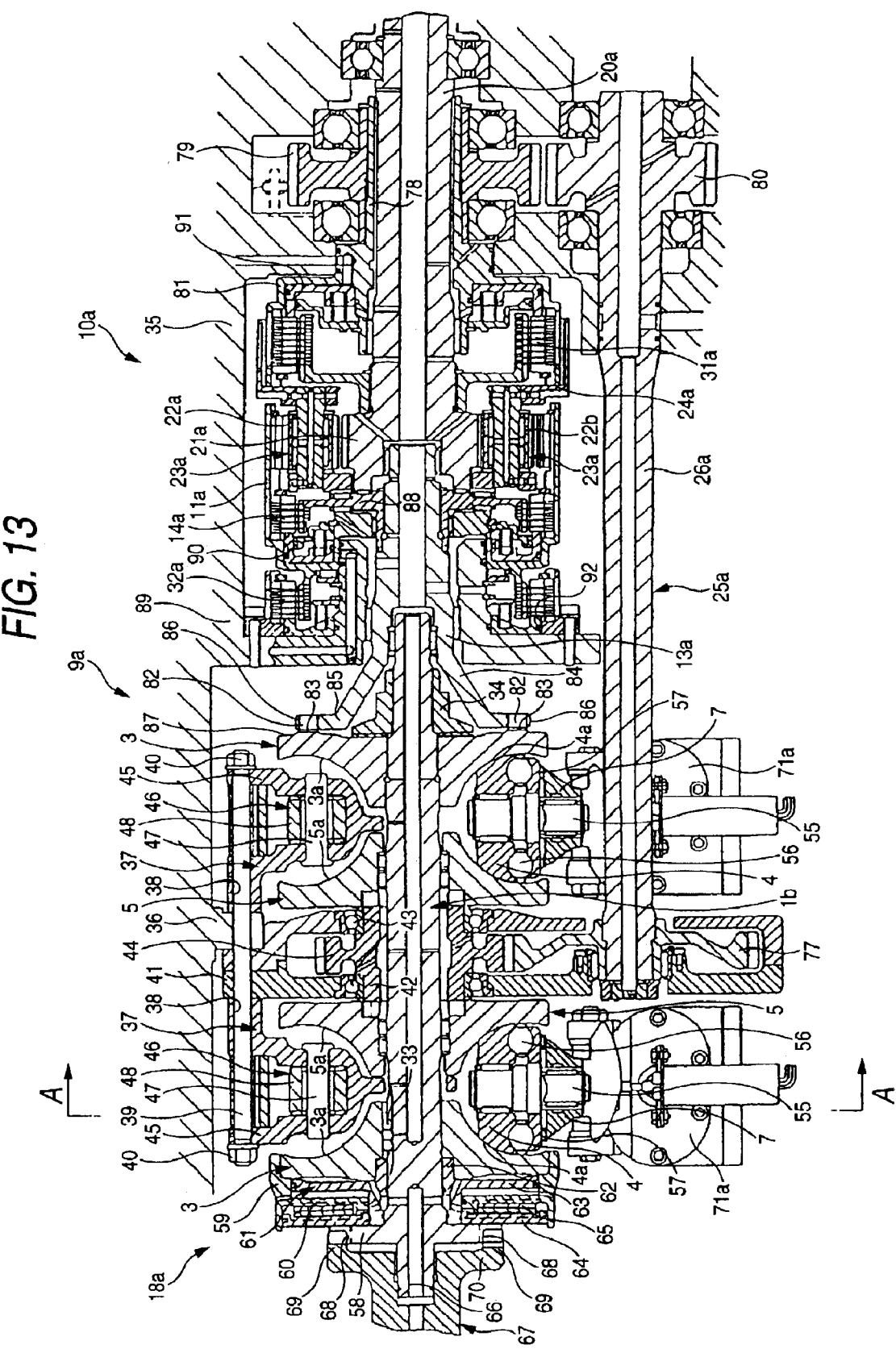
FIG. 13 is a section view of a more concrete version of the above toroidal-type continuously variable transmission.
Figure 14:
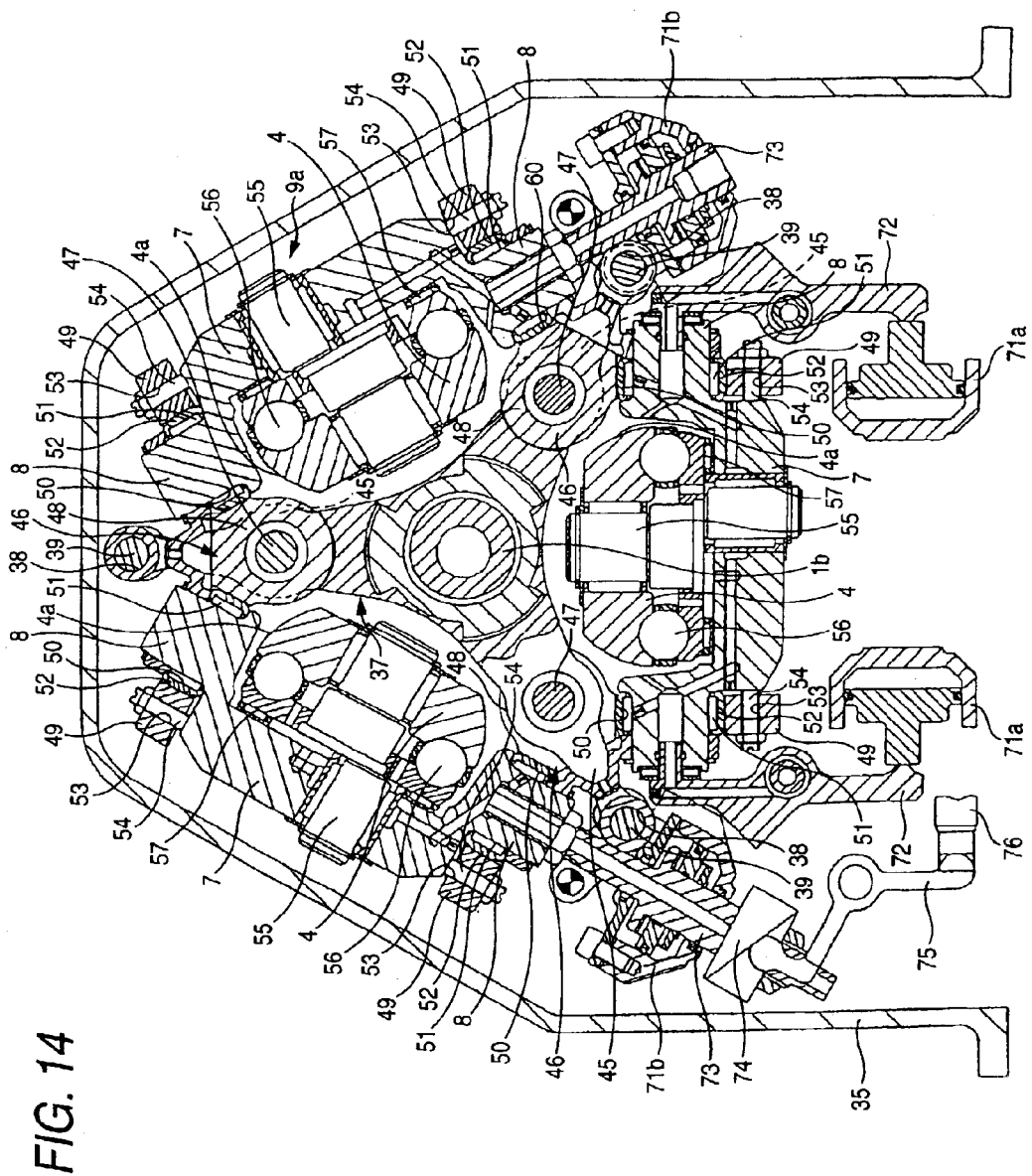
FIG. 14 is a section view taken along the line A—A shown in FIG. 13.
Figure 15:
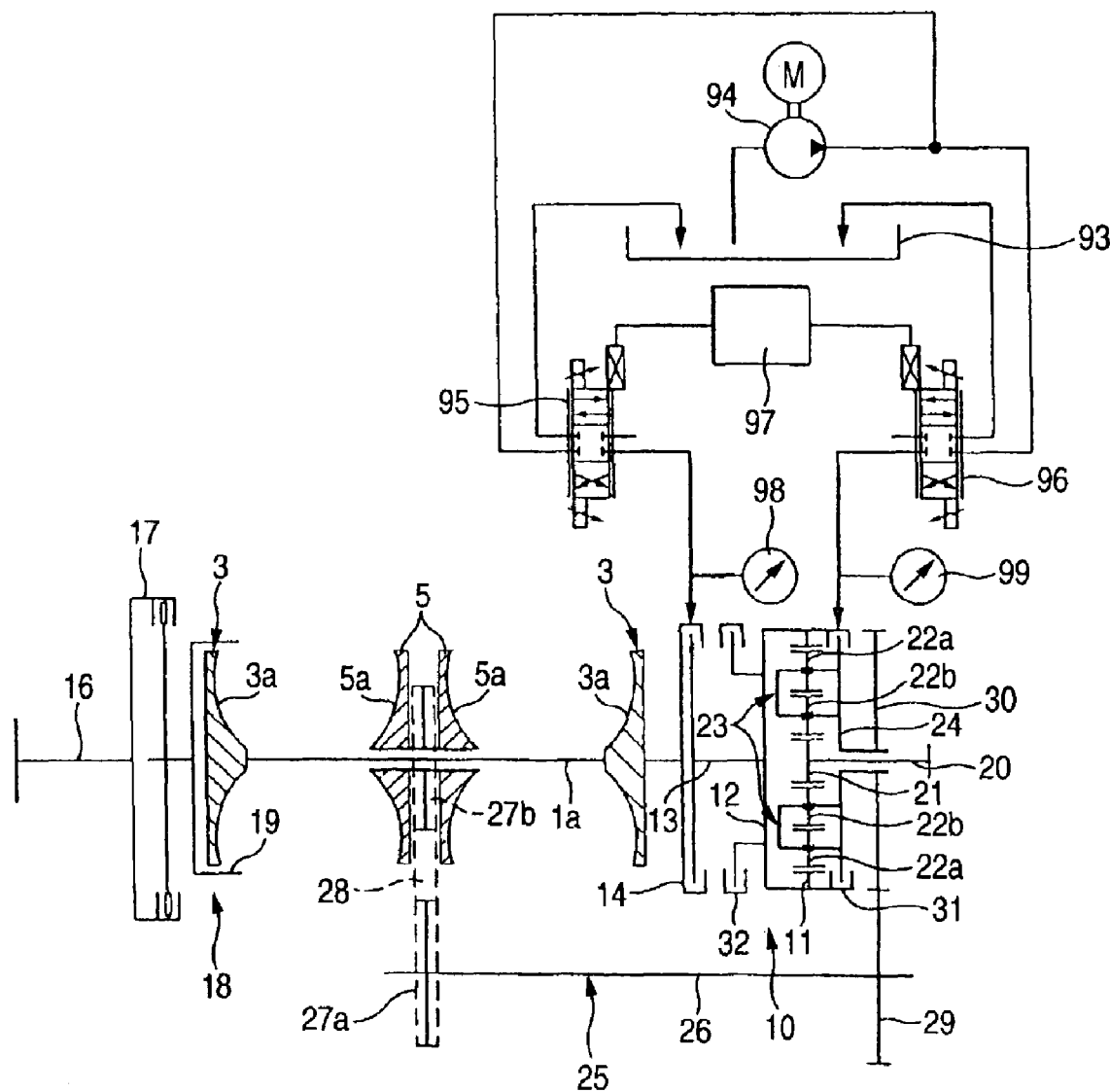
FIG. 15 is a circuit diagram of an apparatus used in a test conducted in the process for developing the present invention.

Now, FIGS. 1A and 1B show a first embodiment of a continuously variable transmission apparatus according to the present invention. By the way, according to the present invention, there is provided a continuously variable transmission apparatus in which a toroidal-type continuously variable transmission and a planetary gear mechanism are combined together through a clutch device including a high speed clutch and a low speed clutch; and, the present continuously variable transmission apparatus is characterized in that the timings for signaling for disconnecting and connecting the high speed and low speed clutches are improved to thereby be able to reduce the incongruous feeling that is generated in the mode switching operation from the high speed mode to the low speed mode. The structure of the present continuously variable transmission apparatus, as a whole, is similar to the structure of the test apparatus shown in the previously discussed FIG. 15; and, the more specific structure of the present continuously variable transmission apparatus is similar to that of the conventional continuously variable transmission apparatus shown in the previously discussed FIGS. 13 and 14. Therefore, the duplicate description of the specific structure of the present continuously variable transmission apparatus is omitted here and description will be given below of the characteristic aspect of the present invention, that is, the timings for signaling for disconnecting and connecting the high speed and low speed clutches.

Figure 16A:
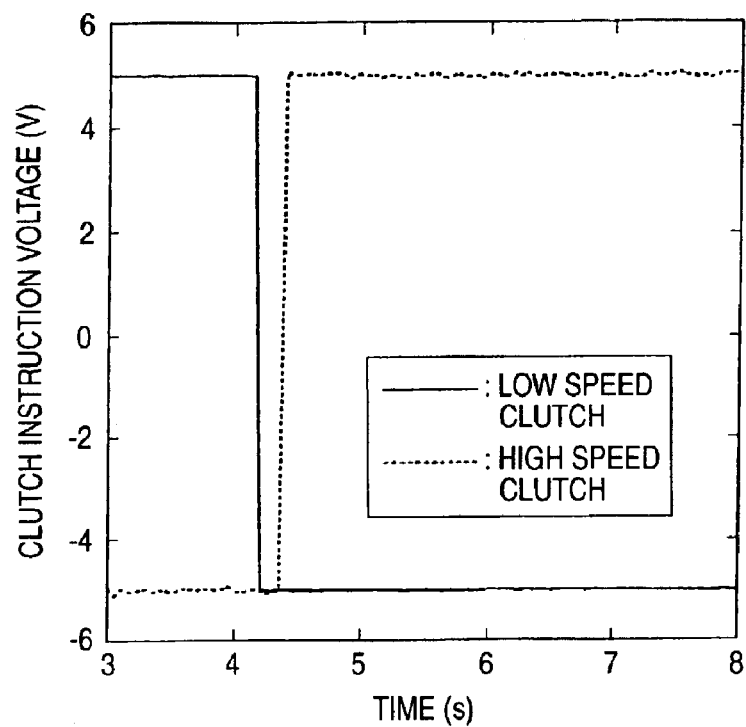
FIGS. 16A and 16B are diagrammatic views of a conventional continuously variable transmission apparatus, showing, according to the passage of time, instruction signals to be applied to low speed and high speed clutches and the connecting states of the respective clutches when the continuously variable transmission apparatus is switched from a low speed mode to a high speed mode.

In the case of the present embodiment, in the mode switching operation from the high speed mode to the low speed mode, at the same time when a signal for cutting off the connection of the high speed clutch is issued as shown by a broken line in FIG. 1A, a signal for connecting the low speed clutch is issued as shown by a solid line in FIG. 1A. Such time delay of 0.2 seconds as shown in the previously discussed FIG. 16A is not set in the present embodiment. Therefore, according to the present embodiment, there can be reduced the time from such disconnected state of the high speed clutch as shown by a broken line in FIG. 1B to such connected state of the low speed clutch as shown by a solid line in FIG. 1B.

Figure 17A:
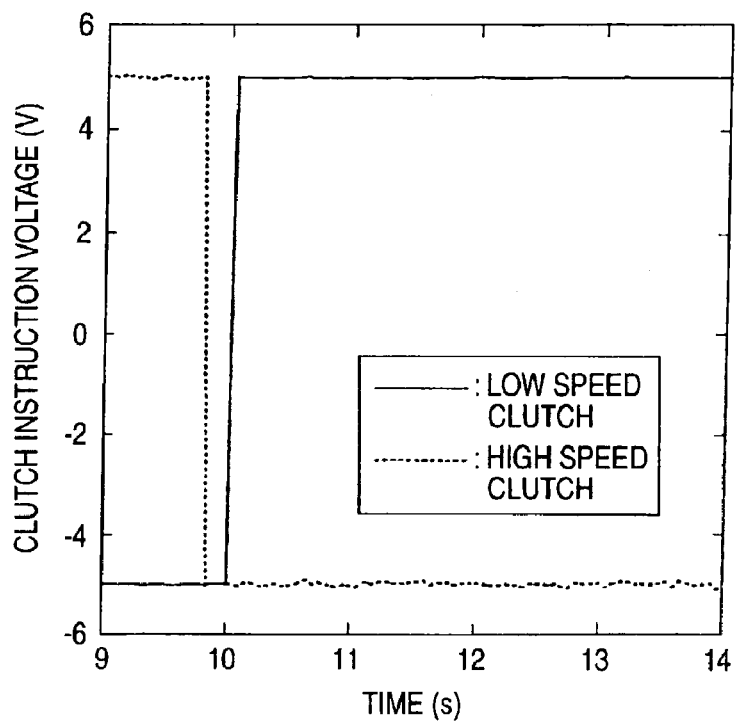
FIGS. 17A and 17B are diagrammatic views of the continuously variable transmission apparatus, showing, according to the passage of time, instruction signals to be applied to low speed and high speed clutches and the connecting states of the respective clutches when the continuously variable transmission apparatus is switched from the high speed mode to the low speed mode.
Figure 17B:
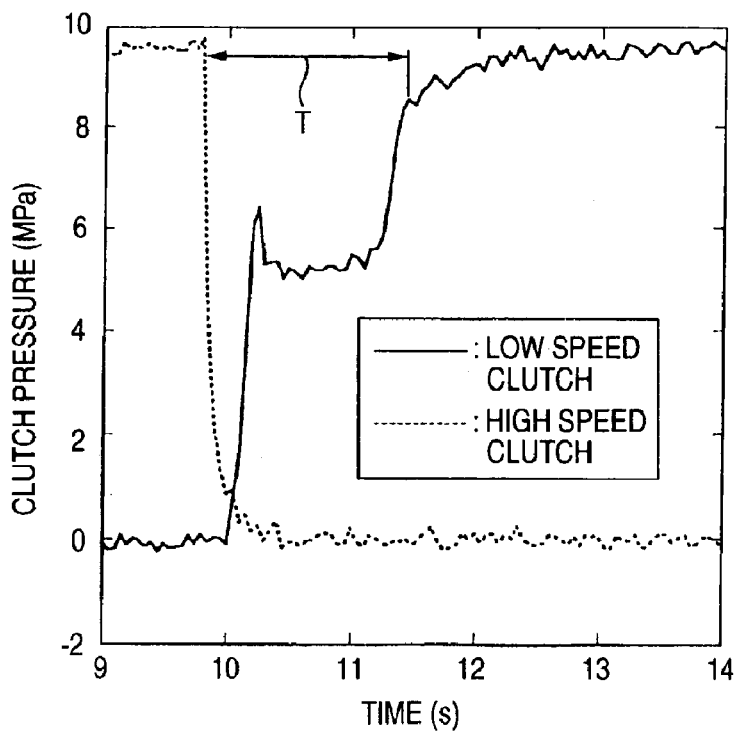

That is, the disconnected state continuing time t (which is shown in FIG. 1B) from the cut-off of the connection of the high speed clutch to the connection of the low speed clutch can be reduced by the time delay (0.2 sec.) when compared with the disconnected state continuing time T (in which, as shown in FIG. 17A), the time delay (0.2 sec.) is set. In this manner, according to the present embodiment, in the mode switching operation from the high speed mode to the low speed mode, the time (the disconnected state continuing time), during which the high speed and low speed clutches are both disconnected, can be reduced to thereby reduce an increase in the number of rotations of the engine in the mode switching operation, which makes it possible to reduce the degree of an incongruous feeling that is given to the driver.

Figure 16B:
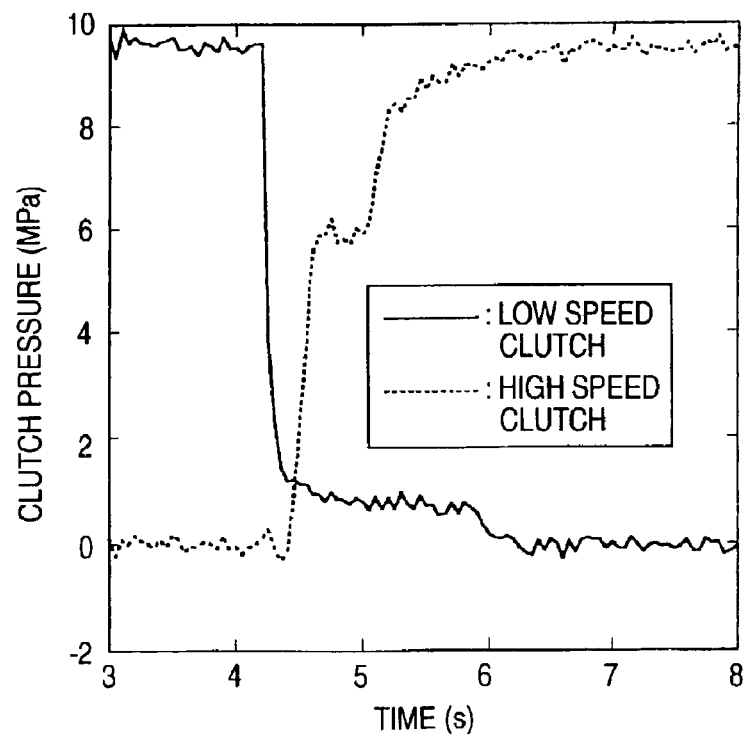

By the way, in the case of the present embodiment, in the mode switching operation from the low speed mode to the high speed mode, as shown in the previously described FIG. 16, there is set a time delay of about 0.2 sec. between the time when a signal for cutting off the connection of the low speed clutch is issued and the time when a signal for connecting the high speed clutch is issued. As described above, the time necessary from issuance of the signal for connecting the high speed clutch to the actual connection of the high speed clutch is short when compared with the low speed clutch. Therefore, in the case of the mode switching operation from the low speed mode to the high speed mode, even in case where it is controlled similarly to the previously described conventional example, there can be reduced the degree of the incongruous feeling that occurs in the mode switching operation.

Next, FIGS. 2A to 3B show a second embodiment of a continuously variable transmission apparatus according to the present invention. According to the present embodiment, the disconnected state continuing time in the mode switching operation from the high speed mode to the low speed mode is shortened further than the previously described first embodiment of the present invention. At the same time, in the case of the present embodiment, the disconnected state continuing time in the mode switching operation from the low speed mode to the high speed mode is also shortened further than the previously described conventional example and the first embodiment of the present invention.

Figure 2A:
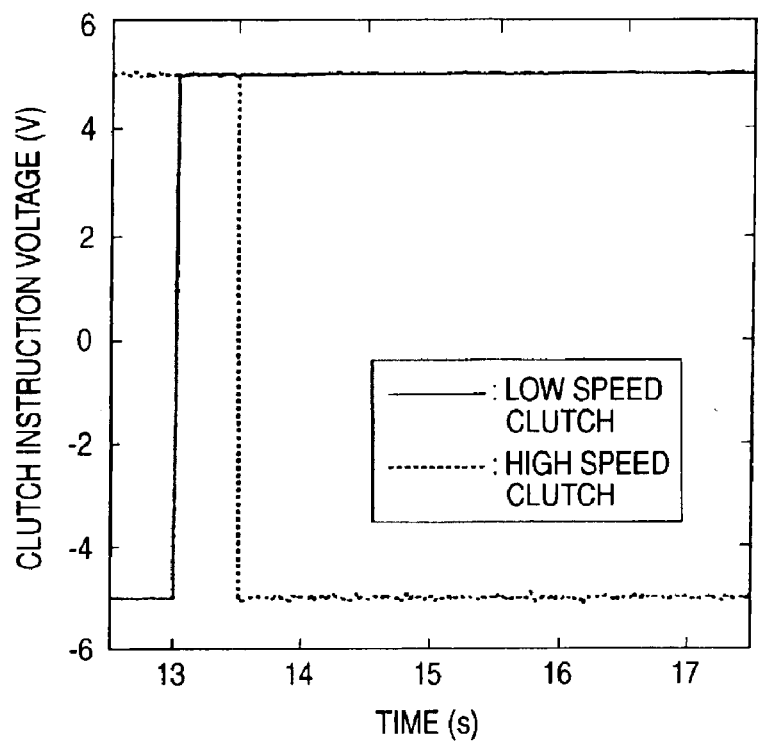
FIGS. 2A and 2B, similarly to FIGS. 1A and 1B, are diagrammatic views of a second embodiment of a continuously variable transmission apparatus according to the present invention.
Figure 2B:
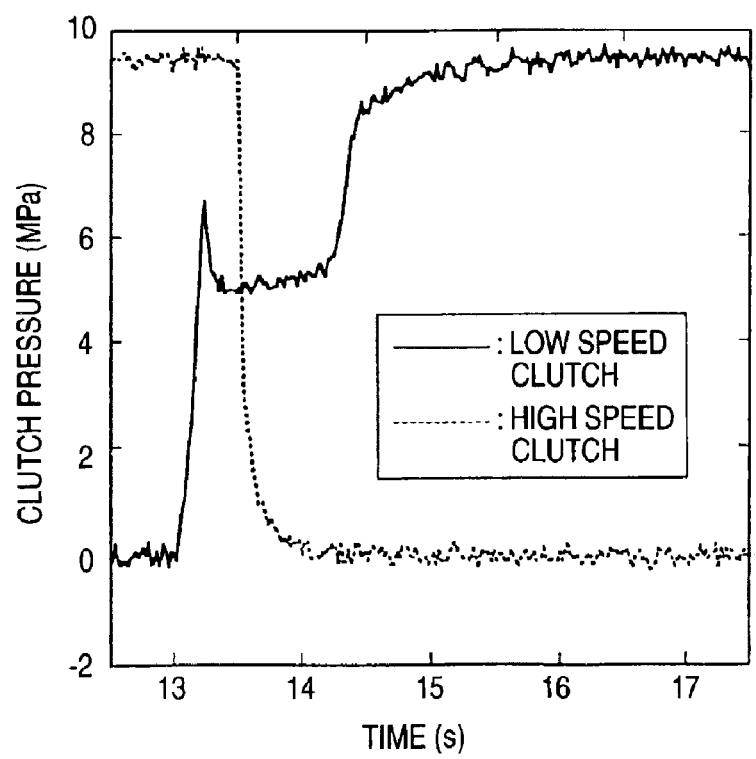

Therefore, according to the present embodiment, in the mode switching operation from the high speed mode to the low speed mode, a little while before a signal for cutting off the connection of the high speed clutch is issued (in the present embodiment, 0.5 sec. before) as shown by a broken line in FIG. 2A, a signal for connecting the low speed clutch is issued as 25 shown by a solid line in FIG. 2A. Therefore, in the process during which the connection of the high speed clutch is cut off as shown by a broken line in FIG. 2H (that is, in the case of the clutch-slipping state), as shown by a solid line in FIG. 2B, the connection of the low speed clutch is started (that is, the low speed clutch is turned into a clutch-slipping state). In other words, the high speed and low speed clutches are both held in the clutch-slipping state. In this state, the high speed and low speed clutches, while slipping, transmit torque. Therefore, according to the present embodiment, in the mode switching operation from the high speed mode to the low speed mode, the time during which the high speed and low speed clutches are both disconnected (the disconnected state continuing time) can be eliminated substantially. As a result of this, an increase in the number of rotations of the engine in the mode switching operation can be avoided substantially, thereby being able to reduce greatly the incongruous feeling given to the driver (or, thereby being able to eliminate the incongruous feeling substantially).

Figure 3A:
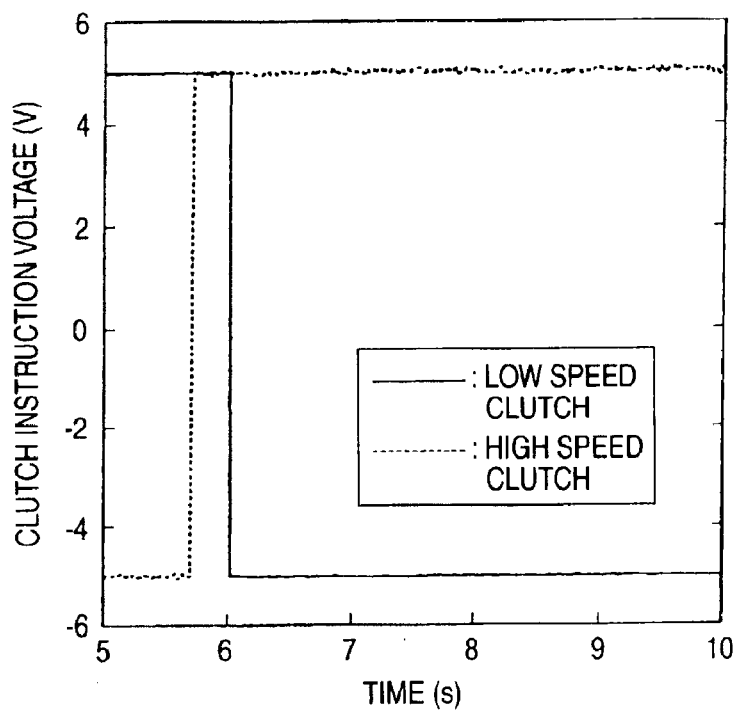
FIGS. 3A and 3B are diagrammatic views of the second embodiment of a continuously variable transmission apparatus according to the present invention, showing, according to the passage of time, instruction signals to be applied to low speed and high speed clutches and the connecting states of the respective clutches when the continuously variable transmission apparatus is switched from the low speed mode to the high speed mode.
Figure 3B:
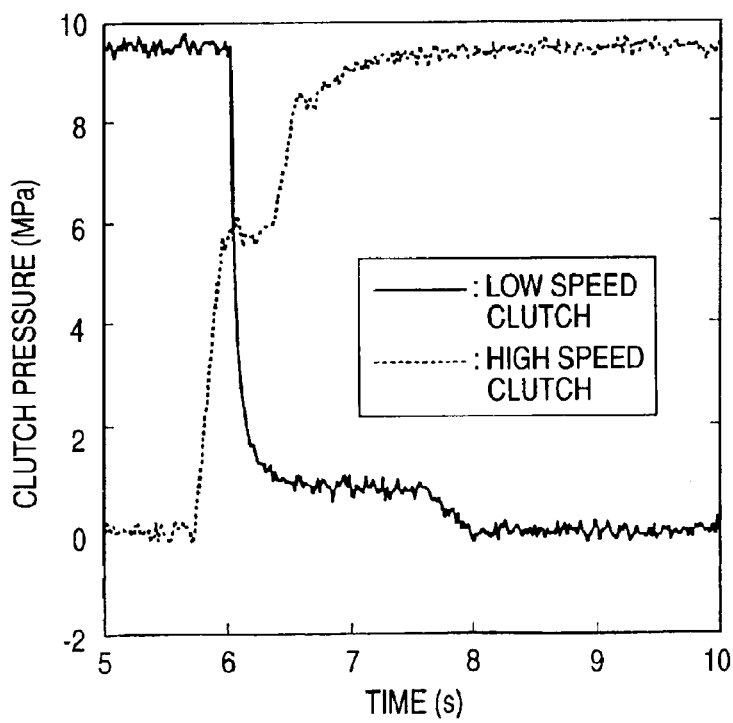

Also, in the case of the present embodiment, in the mode switching operation from the low speed mode to the high speed mode as well, a little while (in the present embodiment, 0.3 sec.) before a signal for cutting off the connection of the low speed clutch is issued as shown by a solid line in FIG. 3A, a signal for connecting the high speed clutch is issued as shown by a broken line in FIG. 3A. Therefore, in the process where the connection of the low speed clutch is cut off in such a manner as shown by a solid line in FIG. 3B (that is, in the clutch slipping state of the low speed clutch), the connection of the high speed clutch is started as shown by a broken line in FIG. 3B (that is, the high speed clutch is turned into a clutch slipping state). In other words, the high speed and low speed clutches are simultaneously turned into their respective clutch slipping states. In this state, these two clutches transmit torque while slipping. Therefore, according to the present embodiment, in the mode switching operation from the low speed mode to the high speed mode as well, there can be substantially eliminated the time (the disconnected state continuing time) during which the high speed and low speed clutches are both disconnected. As a result of this, in the present mode switching operation; there can be substantially eliminated an increase in the number of rotations of the engine, which can reduce the incongruous feeling that is given to the driver (or, can reduce the incongruous feeling substantially).

By the way, when enforcing the present embodiment, the size of the time delay between the timings for issuance of the signals for disconnecting and connecting the respective clutches is not limited to the above value but it may be determined in the stage of design according to the capacity of the high speed and low speed clutches and the resistance of the oil pressure pipe.

Also, description has been given heretofore of the present invention assuming that the present invention is applied to the structures of a continuously variable transmission apparatus of a so called split type in which the toroidal-type continuously variable transmissions 9, 9a are combined with the planetary gear mechanisms 10, 10a (FIGS. 12 to 15); in the low speed running operation, the power is transmitted only by the toroidal-type continuously variable transmissions 9, 9a; and, in the high speed running operation, the main power is transmitted by the planetary gear mechanisms 10, 10a, while the transmission ratio is adjusted by the toroidal-type continuously variable transmissions 9, 9a. However, the present invention can also be applied to a continuously variable transmission apparatus of a so called geared neutral type in which a toroidal-type continuously variable transmission is combined with a planetary gear mechanism, and, without switching the clutches, the reversing stopping and advancing states can be realized. In the case of a toroidal-type continuously variable transmission to be incorporated into such continuously variable transmission apparatus of a so called geared neutral type, incorporation of the present toroidal-type continuously variable transmission is effective because it can reduce the incongruous feeling in the mode switching operation from the high speed to the low speed and vice versa. Further, the present invention can also be effectively applied to a continuously variable transmission apparatus which, as disclosed in the above-cited publication JP-A-2000-220729, is different from the continuously variable transmission apparatus of a power split type and a geared neutral type, comprises a toroidal-type continuously variable transmission and a planetary gear mechanism, and switches low speed and high speed modes over to each other using low speed and high speed clutches.

Since the present invention is structured and can be operated in the above-mentioned manner, the present invention can reduce the incongruous feeling to be applied to the driver in the mode switching operation and can contribute toward realizing a continuously variable transmission apparatus which can provide a high efficiency through a combination of a toroidal-type continuously variable transmission with a planetary gear mechanism.

Now, description will be given below of a third embodiment of a continuously variable transmission apparatus according to the present invention with reference to FIGS. 4 to 8.

Figure 4:
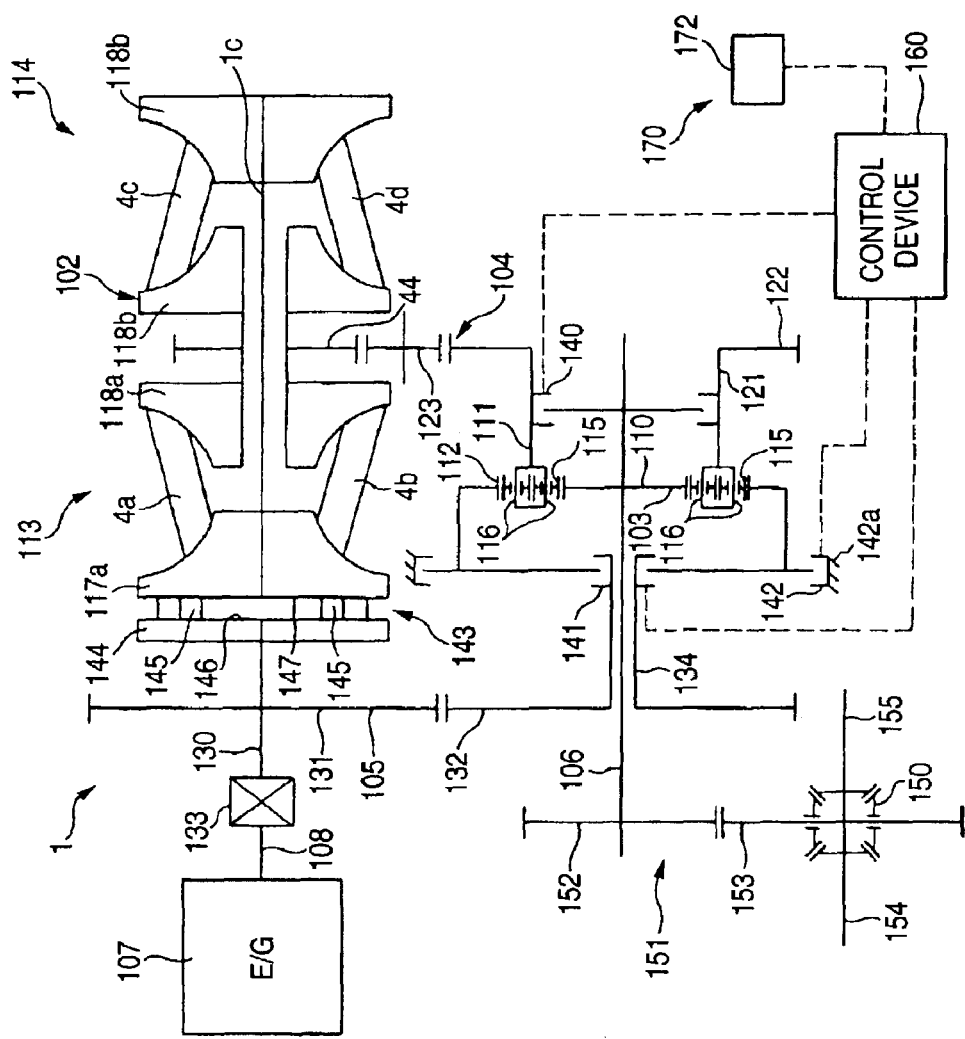
FIG. 4 is a typical view of a third embodiment of a continuously variable transmission apparatus according to the present invention.
Figure 18:
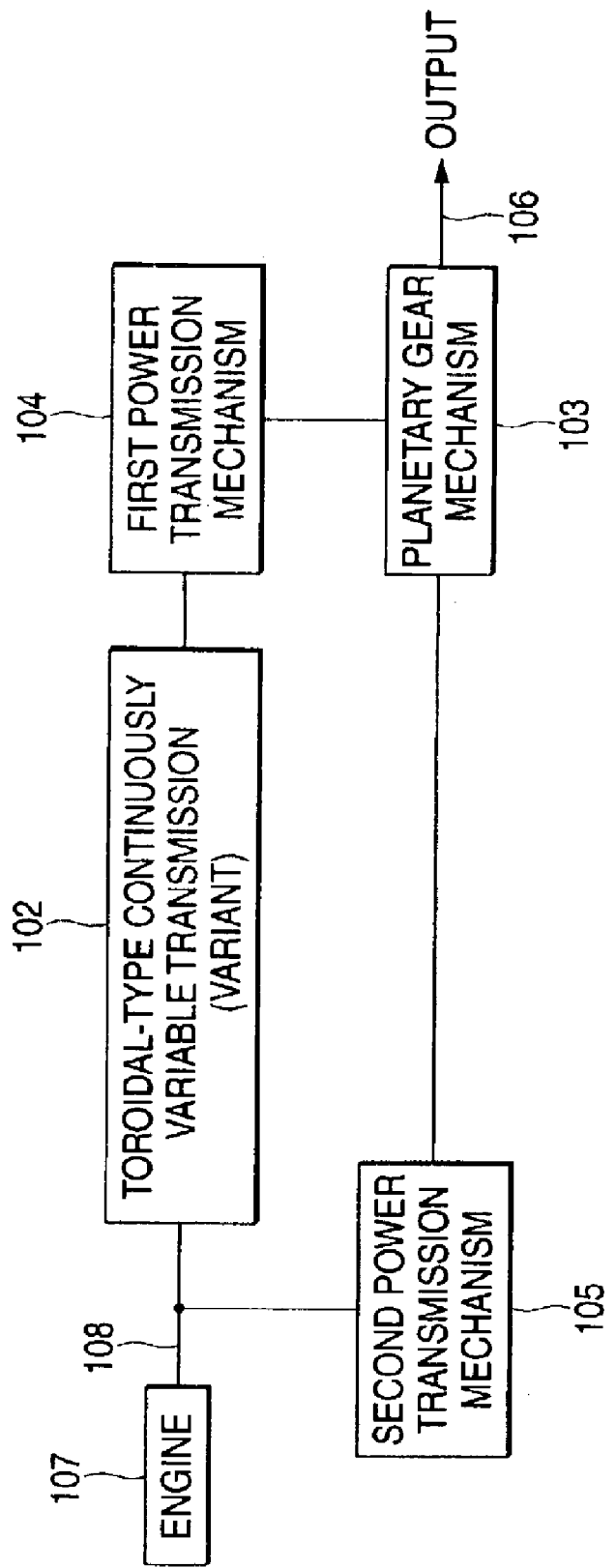
FIG. 18 is a block diagram of the general structure of a continuously variable transmission apparatus including a planetary gear mechanism.
Figure 19:
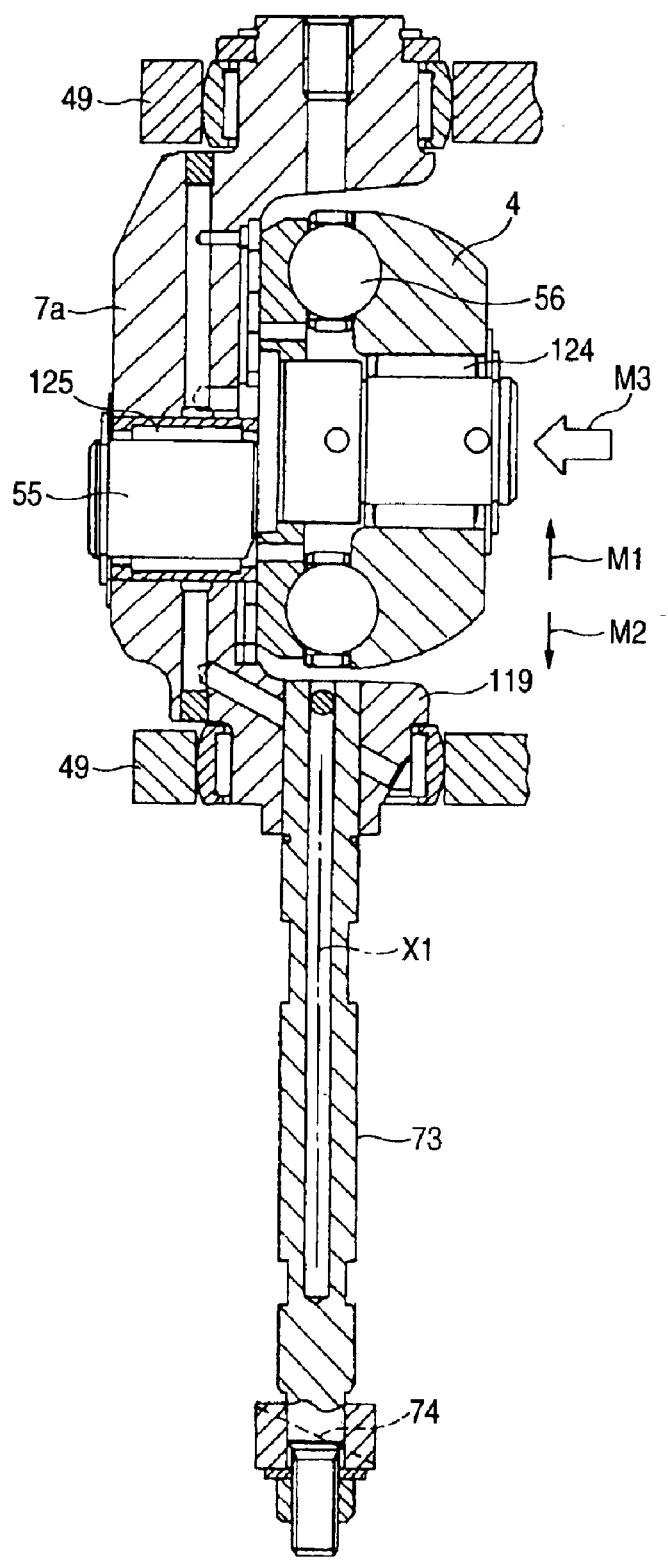
FIG. 19 is a section view of power rollers and trunnions used in a toroidal-type continuously variable transmission.
Figure 20:
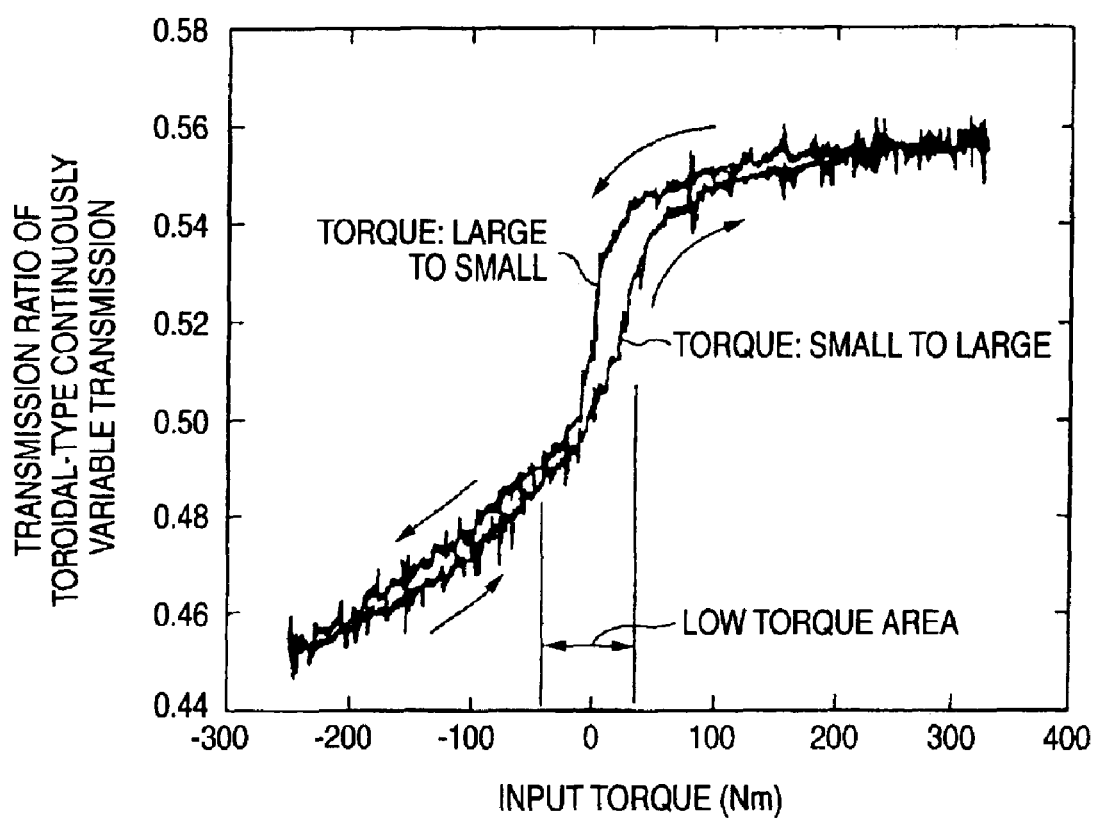
FIG. 20 is a graphical representation of the relationship between the input torque and transmission ratios of a conventional continuously variable transmission apparatus.
Figure 21A:
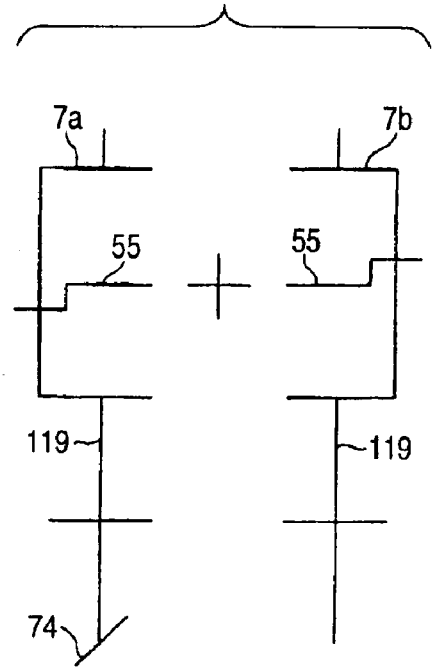
FIG. 21A is a typical front view of a trunnion when no load is applied thereto; and, FIG. 21B is a typical front view of the trunnion when a load is applied thereto.
Figure 21B:
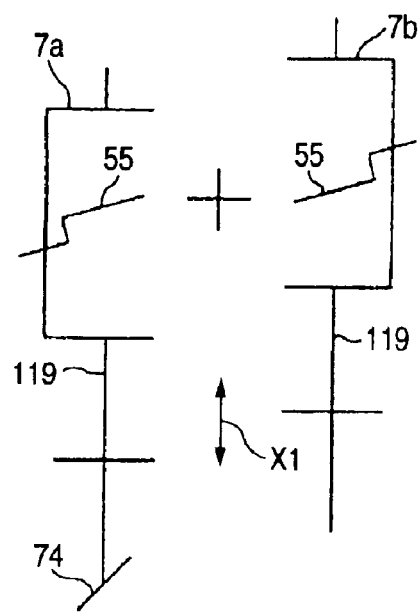
Figure 22:
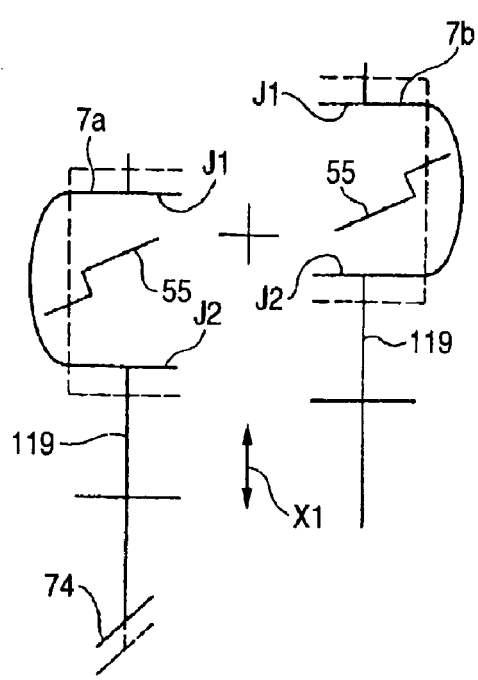
FIG. 22 is a typical front view of the trunnion when the load applied increases further; and, FIG. 23 is a graphical representation of variable widths, between the input torque and transmission ratios of a conventional continuously variable transmission apparatus.
Figure 23:
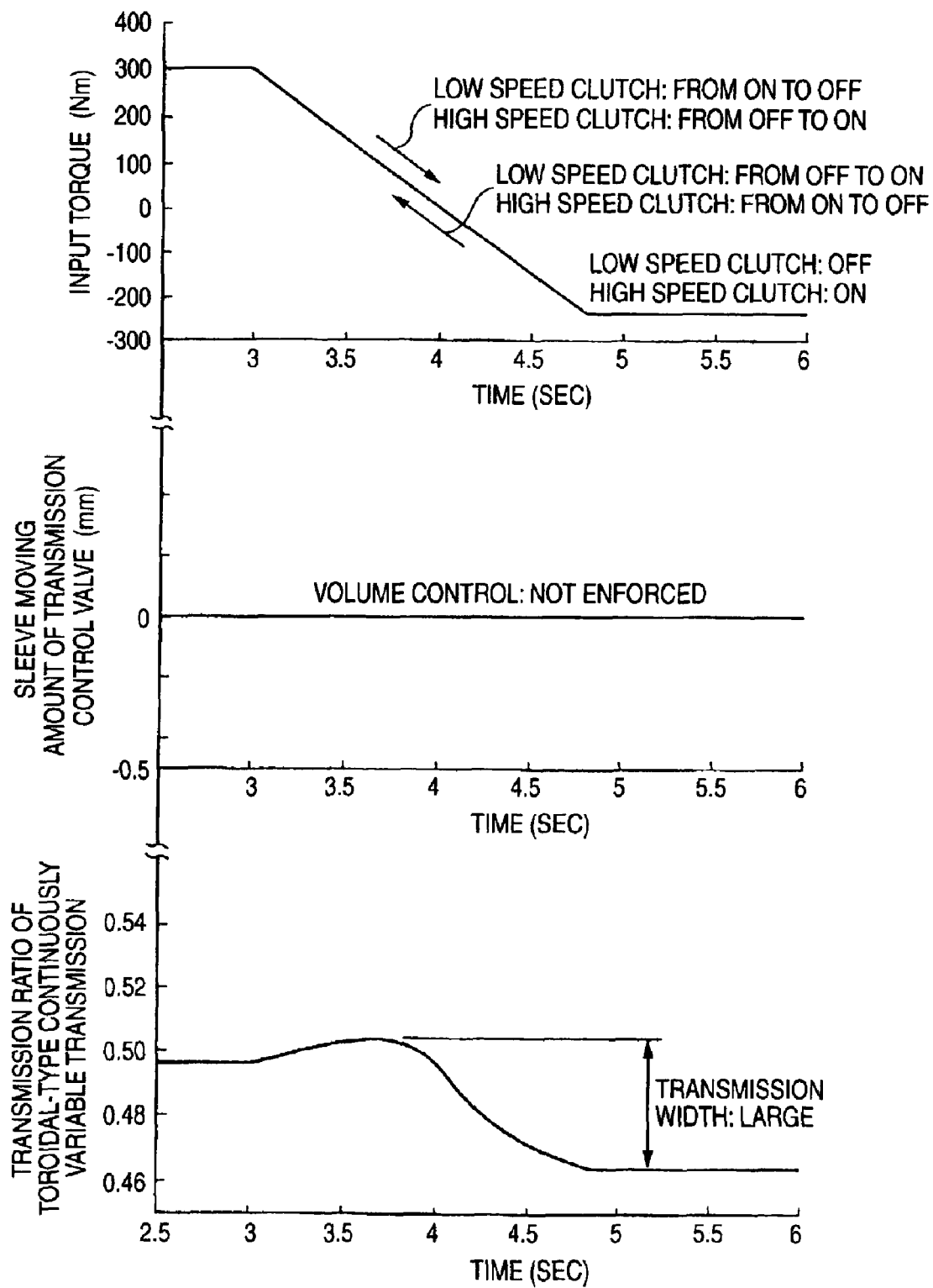

A continuously variable transmission apparatus shown in FIG. 4, similarly to the continuously variable transmission apparatus shown in FIG. 18, comprises a double cavity type of half toroidal-type continuously variable transmission 102, a planetary gear mechanism 103, a first power transmission mechanism 104, a second power transmission mechanism 105, and a drive shaft 108 which can be rotated by the power of an engine 107. The first power transmission mechanism 104 corresponds to a first power transmission system as set forth in the patent claims of the present invention, while the second power transmission mechanism 105 corresponds to a second power transmission system as set forth in the patent claims of the present invention.

The toroidal-type continuously variable transmission 102 comprises a first input side disk 117a and a first output side disk 118a cooperating together in defining a first cavity 113, as well as a second input side disk 117b and a second output side disk 118b cooperating together in defining a second cavity 113.

Between the first input side and output side disks 117a and 118a, there are interposed a pair of first power rollers 4a and 4b; and, the outer peripheral surfaces of the power rollers 4a and 4b are respectively contacted with the traction surfaces of the first input side and output side disks 117a and 118a. And, between the second input side and output side disks 117b and 118b, there are interposed a pair of second power rollers 4c and 4d; and, the outer peripheral surfaces of the power rollers 4a and 4d are respectively contacted with the traction surfaces of the second input side and output side disks 117b and 118b.

Figure 6:
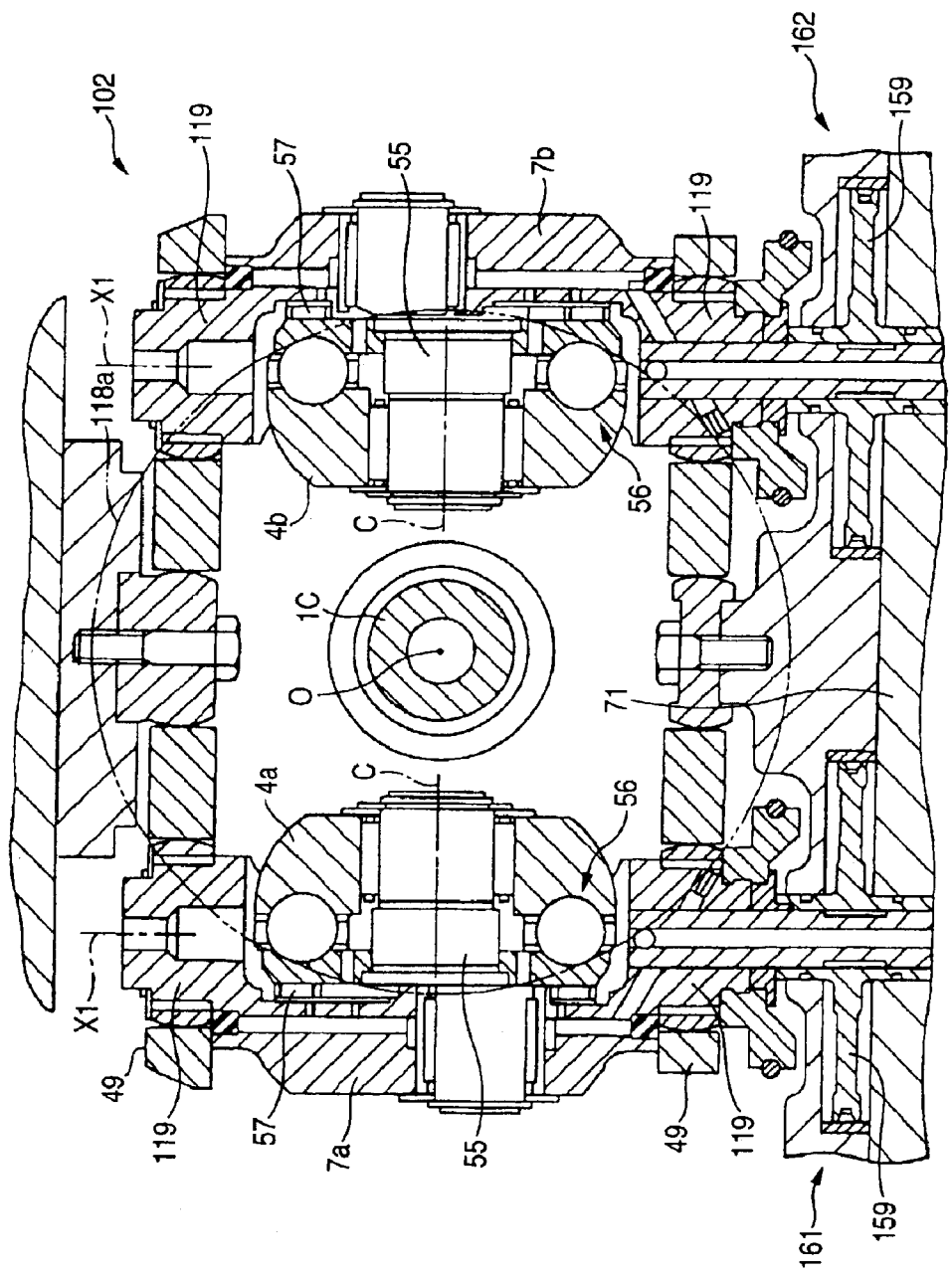
FIG. 6 is a section view of the toroidal-type continuously variable transmission shown in FIG. 5, taken along the line F3—F3 shown in FIG. 5.
Figure 7:
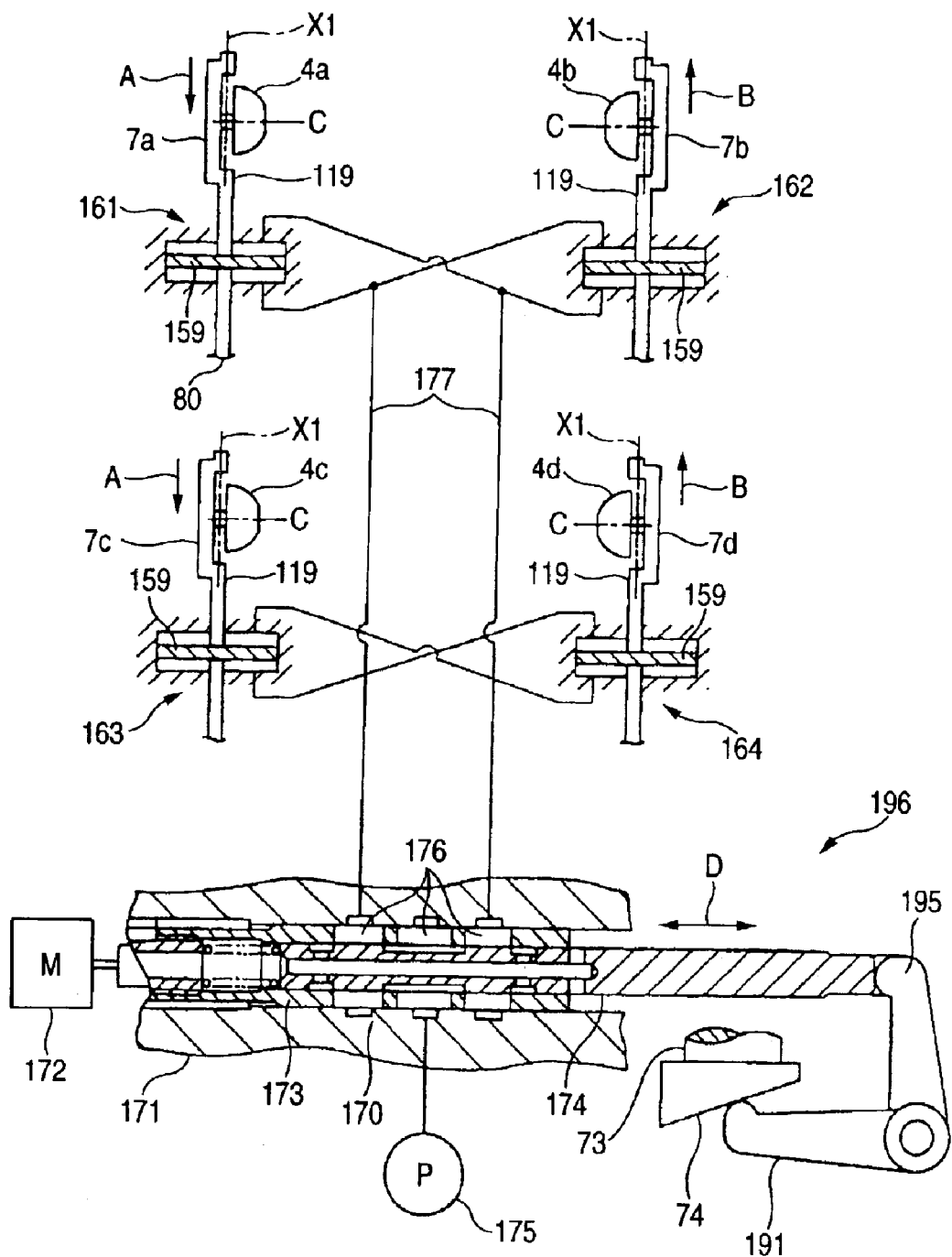
FIG. 7 is a section view of a transmission control valve and a feedback mechanism employed in the continuously variable transmission apparatus shown FIG. 4.

As shown in FIG. 6, the first power rollers 4a and 4b are respectively rotatably supported on shift shafts 55 which are respectively mounted on their associated first trunnions 7a and 7b. The second power rollers 4c and 4d are respectively rotatably supported on shift shafts 55 mounted on their associated second trunnions 7c and 7d (which are shown in FIG. 7).

As the trunnions 7a and 7b in the first cavity 113 are shown representatively in FIG. 6, the trunnions 7a–7d respectively include their associated trunnion shafts 119. The trunnion shafts 119 are respectively supported on their associated support members 49, 49. The trunnions 7a–7d not only can be moved in the axes X1 directions of their associated trunnion shafts 119 but also can be swung about the axes X1, respectively.

Between the power rollers 4a–4d and trunnions 7a–7d, there are interposed thrust ball bearings 56, respectively. Each of the thrust ball bearings 56 includes an outer ring, a ball, and a thrust needle roller bearing 57. The power rollers 4a–4d are rotatably supported on the trunnions 7a–7d by their respective thrust ball bearings 56.

Figure 5:
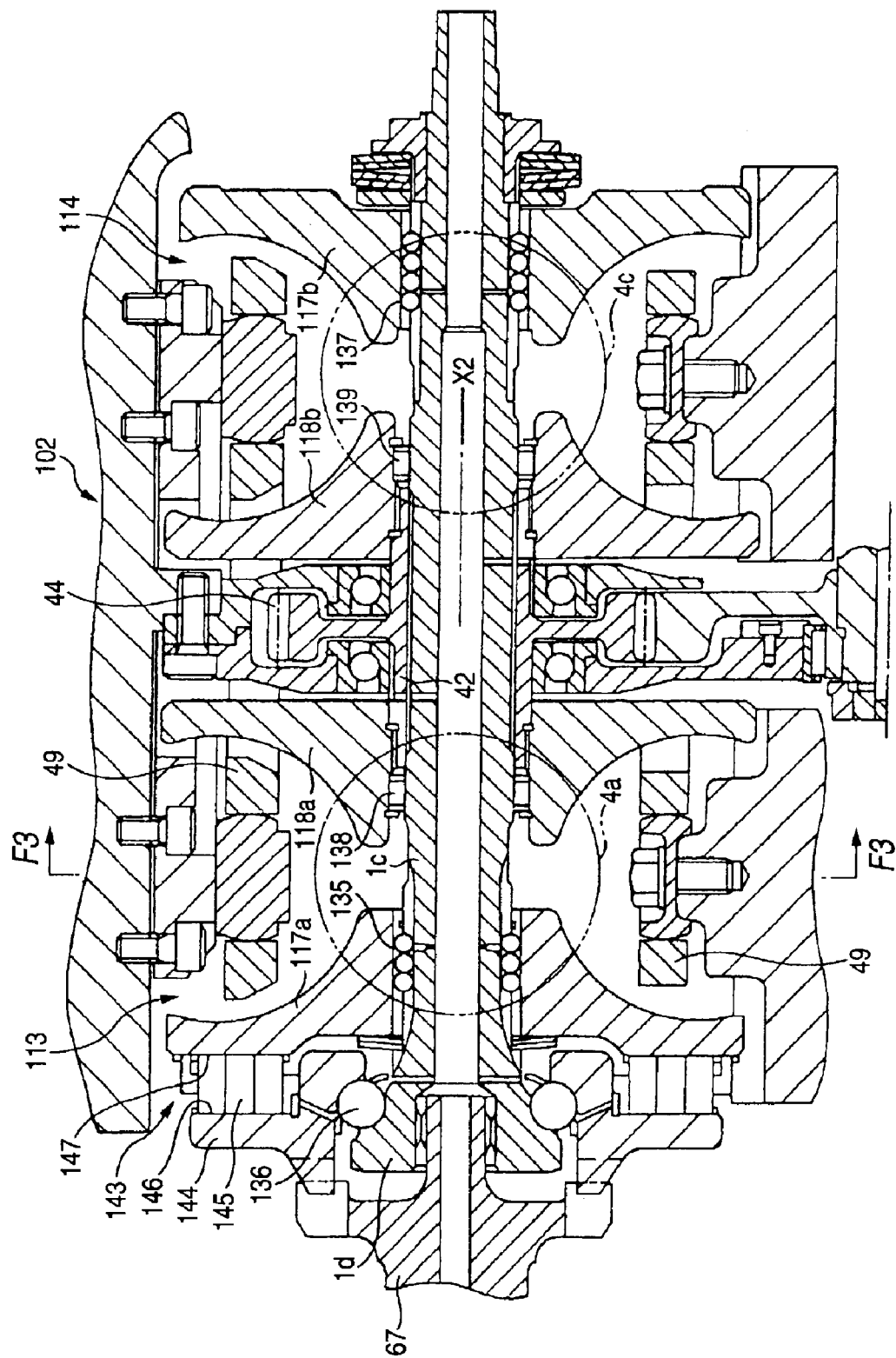
FIG. 5 is a section view of a toroidal-type continuously variable transmission included in the continuously variable transmission apparatus shown FIG. 4, taken along the axial direction thereof.

As shown in FIG. 5, an input shaft 1c is disposed so as to penetrate through the center portions of the input side disks 117a, 117b and output side disks 118a, 118b. In the neighboring portion of one end, portion 1d of the input shaft 1c, there is disposed a drive shaft 67 which can be driven or rotated by a drive source such as an engine (not shown). The input shaft 1c and drive shaft 67 are connected to each other by a bearing in such a manner that they can be rotated with respect to each other.

The first input side disk 117a is mounted on the input shaft 1c in such a manner that it can be moved in the axis X2 direction of the input shaft 1c while it is prevented against rotation by a first ball spline 135. Also, the second input side disk 117b is mounted on the input shaft 1c in such a manner that it can be moved in the axis X2 direction of the input shaft 1c while it is prevented against rotation by a second ball spline 137. Therefore, the input side disks 117a, 117b can be rotated integrally with the input shaft 1c.

The output side disks 118a, 118b are respectively interposed between the input side disks 117a, 117b. The first output side disk 118a is disposed opposed to the first input side disk 117a, whereas the second output side disk 118b is disposed opposed to the second input side disk 117b. These output side disks 118a, 118b are respectively supported on the input shaft 1c through their associated bearings 138, 139 in such a manner that they can be rotated with respect to the input shaft 1c. The output side disks 118a, 118b are connected to each other through an output sleeve 42 and can be rotated in synchronization with each other. On the output sleeve 42, there is disposed an output gear 44.

On the back surface side of the first input side disk 117a, there is disposed a loading cam mechanism 143. The loading cam mechanism 143 includes a cam disk 144 and a roller 145. The cam disk 144 is supported on the input shaft 1c through a rolling bearing 136 in such a manner that it can be rotated. In the mutually opposed portions of the cam disk 144 and first input side disk 117a, there are formed cam surfaces 146 and 147 respectively; and, the roller 145 is inserted into between the cam surfaces 146 and 147.

In case where the drive shaft 67 is rotated with the roller 145 inserted between the cam surfaces 146 and 147, the cam disk 144 is rotated, with the result that not only the first input side disk 117a is pressed toward the first output side disk 118a but also the first input side disk 117a is rotated together with the cam disk 144. Also, since the reaction force received by the cam disk 144 is applied through the rolling bearing 136 to the input shaft 1c, the second input side disk 117b is pressed toward the second output side disk 118b.

The torque of the engine, which has been transmitted from the drive shaft 67 to the cam disk 144, rotates the input side disks 117a and 117b, and the rotational movements of the input side disks 117a and 117b are transmitted through the power rollers 4a–4d to the output side disks 118a and 118b, thereby rotating the output gear 44.

In the above-structured half-toroidal-type continuously variable transmission 102 of a double cavity type, in case where the inclination angles of the power rollers 4a, 4b in the first cavity 113 and the inclination angles of the power rollers 4c, 4d in the second cavity 114 are changed in synchronization with each other, the transmission ratio of the output side disks 118a, 118b to the input side disks 117a, 117b can be changed.

In other words, in case where, according to the inclination angle of the power rollers 4a–4d, not only the rotation radius ratio of the contact points between the power rollers 4a, 4b in the first cavity 113 and first input side and output side disks 117a, 118a is changed but also the rotation radius ratio of the contact points between the power rollers 4c, 4d in the second cavity 114 and second input side and output side disks 117b, 118b is changed, there can be obtained a desired transmission ratio.

The trunnions 7a, 7b in the first cavity 113 can be respectively shifted in the axes X1 directions of their associated trunnion shafts 119 by first actuators 161, 162 using oil pressure pistons 159 (both of which are shown in FIG. 7). And, the trunnions 7c, 7d in the second cavity 114 can also be respectively shifted in the axes X1 directions of their associated trunnion shafts 119 by second actuators 163, 164 using oil pressure pistons 159.

Referring in more detail to this, when changing the transmission ratio, in the first cavity 113, the first trunnions 7a, 7b are shifted in the mutually opposite directions using the first actuators 161, 162; and, in the second cavity 114, the second trunnions 7c, 7d are shifted in the mutually opposite directions using the second actuators 163, 164.

For example, in FIG. 7, when shifting the left-side trunnions 7a, 7c in the arrow mark A direction, the right-side trunnions 7b, 7d are shifted in the arrow mark B direction. As a result of this, the left-side power rollers 4a, 4c are shifted in the arrow mark A direction and, at the same time, the right-side power rollers 4b, 4d are shifted in the arrow mark B direction.

In case where the power rollers 4a-4d are shifted in the axis X1 direction, the respective centers of rotation C of the power rollers 4a–4d are offset with respect to the centers of rotation O (which are shown in FIG. 6) of the respective disks 117a, 117b, 118a, 118b. Thus, at the contact points between the disks 117a, 117b, 118a, 118b and power rollers 4a–4d, according to the offset amounts, there are generated moment forces which rotate the power rollers 4a–4d in an swung manner. Due to such moment forces, the power rollers 4a–4d are caused to rotate swingly about the axes X1 at an angle corresponding to the desired transmission ratio.

The actuators 161–164 can be driven by a transmission control valve 170. As shown in FIG. 7, the transmission control valve 170 is incorporated into a housing 171. The transmission control valve 170 comprises a sleeve 173 which can be shifted in the axis direction (that is, in FIG. 7, the direction shown by the arrow mark D) by a stepping motor 172, and a spool 174 which is inserted into the interior of the sleeve 173 in such a manner that it can be moved in the axis D direction. In the sleeve 173, spool 174 and housing 171, there are formed oil passages 176, 177 which, when the sleeve 173 and spool 174 are situated at their given positions with respect to each other, allow an oil pressure source 175 and actuators 161, 164 to communicate with each other.

On the end portion of a rod 73, which can be moved integrally with the trunnion shaft 119 of one (7a) of the trunnions 7a, 7b in the first cavity 113, there is mounted a precess cam 74. The precess cam 74, a cam follower 191 to follow the precess cam 74 and a transmission member 195 used to transmit the shifting motion of the cam follower 191 to the spool 174 of the transmission control valve 170 cooperate together in constituting a feedback mechanism 196.

Next, description will be given below of the operation of the transmission control valve 170 and feedback mechanism 196.

When switching the transmission state, in case where the sleeve 173 of the transmission control valve 170 is shifted by a desired amount in the axis direction (in FIG. 7, the direction shown by the arrow mark D) by the stepping motor 172 (shown in FIG. 7), the oil passage 176 of the transmission control valve 170 is opened by a desired amount. In case where the oil passage 176 is opened, oil pressurized by the oil pressure source 175 is supplied through the oil passages 177 to the actuators 161–164, so that the trunnions 7a–7d are moved in the desired direction (in FIG. 7, the direction shown by the arrow mark A or B).

In case where the trunnions 7a–7d are shifted by the desired amount in the direction of the axis X1 of the trunnion shaft 119 in this manner, the power rollers 4a–4d are shifted in the axis X1 direction, so that the rotation centers C of the power rollers 4a–4d are offset with respect to the rotation centers O (which are shown in FIG. 6) of the disks 117a, 117b, 118a, 118b. Thus, at the contact points between the disks 117a, 117b, 118a, 118b and power rollers 4a–4d, according to the offset amounts, there are generated moment forces which rotate the power rollers 4a–4d in an swung manner. Due to such moment forces, the power rollers 4a–4d are caused to rotate swingly at an angle corresponding to the desired transmission ratio and, at the same time, the trunnions 7a–7d are also rotated swingly in the same direction.

In case where the trunnions 7a–7d are also rotated swingly in this manner, the movement of the first trunnion 7a is transmitted through the rod 73 to the precess cam 74. And, according to the position (the position in the axial direction thereof and the position around the axis thereof) of the precess cam 74, the cam follower 191 is shifted. The transmission member 195 is moved by the angle that corresponds to the shifting amount of the cam follower 191, so that the spool 174 of the transmission control valve 170 is moved in the axial direction (that is, in FIG. 7, the direction shown by the arrow mark D). That is, while the swung rotation angle of the trunnions 7a–7d remain unchanged, the oil passages 176 of the transmission control valve 170 are closed to thereby cut off the flow of the oil with respect to the actuators 161–164. In case where the movements of the trunnions 7a–7d are feedbacked to the transmission control valve 170 in this manner, the trunnions 7a–7d are shifted in the axis X1 direction and around the axis X1 by the amount that corresponds to the shift amount of the sleeve 173 caused by the stepping motor 172.

Now, the planetary gear mechanism 103 shown in FIG. 4 comprises three elements; that is, a sun gear 110, a carrier 111, and a ring gear 112. The sun gear 110 is fixed to the axial direction middle portion of an output shaft 106. Therefore, this output 106 can be rotated as the sun gear 110 is rotated. On the periphery of the sun gear 110, there is disposed the ring gear 112 in such a manner that it is concentric with the sun gear 110 and can be rotated independently of the sun gear 110.

Between the inner peripheral surface of the ring gear 112 and the outer peripheral surface of the sun gear 110, there are disposed a plurality of planetary gear sets 115 (normally, three to four sets). Each of the planetary gear sets 115 is composed of a pair of planetary gears which are meshingly engaged with each other. In each of the planetary gear sets 115, one planetary gear is meshingly engaged with the ring gear 112, while the other planetary gear is meshingly engaged with the sun gear 110.

The reason for use of such planetary gear sets 115 each composed of a pair of planetary gear is to set the rotation directions of the sun gear 110 and ring gear 112 so as to coincide with each other. However, in case where such mutual coincidence of the rotation directions of the sun gear 110 and ring gear 112 is not necessary due to the relationship with the other composing elements of the continuously variable transmission apparatus, the common planetary gears may also be meshingly engaged with both of the gears 110, 112.

A pair of planetary gears constituting each of the planetary gears 115 are rotatably supported by pivot shafts 116 which are disposed on the carrier 111. The pivot shafts 116 are disposed in parallel to the output shaft 106. The carrier 111 is fixed to a circular-pipe-shaped first transmission shaft 121 in such a manner that it is concentric with the shaft 121. The first transmission shaft 121 is rotatably supported on the output shaft 106 by a rolling bearing such as a needle roller bearing.

A transmission gear 122 is fixed to the outer peripheral surface of the first transmission shaft 121 through spline engagement. The transmission gear 122 and an output gear 44 are respectively meshingly engaged with an intermediate gear 123. The transmission gear 122, output gear 44 and intermediate gear 123 cooperate together in constituting the first power transmission mechanism 104.

The first power transmission mechanism 104 has a function to transmit the power between the output disks 118a, 118b of the toroidal-type continuously variable transmission 102 and the carrier 111 of the planetary gear mechanism 103. As the output disks 118a, 118b are rotated, the carrier 111 is rotated in the same direction as the output disks 118a, 118b at the speed that corresponds to the ratio of the number of teeth between the output gear 44 and transmission gear 122.

An input shaft 130 on the engine side and the ring gear 112 of the planetary gear mechanism 103 are capable of transmitting the rotation power thereof between them through the second power transmission mechanism 105. The second power transmission mechanism 105 is composed of a drive gear 131 and a driven gear 132 which are meshingly engaged with each other. The drive gear 131 is fixed to the axial direction middle portion of the input shaft 130 between a start clutch 133 and a loading cam mechanism 143. The driven gear 132 is concentric with the output shaft 106 and can be rotated with respect to the output shaft 106.

To the driven gear 132, there is fixed a second transmission shaft 134 which is formed as a circular pipe. This transmission shaft 134 is rotatably supported on the output shaft 106 by a rolling bearing such as a needle roller bearing. Therefore, the driven gear 132 can be rotated about the output shaft 106. In the case of the present embodiment, the number of teeth of the drive gear 131 is set equal to the number of teeth of the driven gear 132 so that the speed reducing ratio of the second power transmission mechanism 105 is set 1. For this reason, with the rotation of the input shaft 130, the second transmission shaft 134 can be rotated in the opposite direction to the input shaft 130 at the same angular speed as the input shaft 130.

The continuously variable transmission apparatus according to the present embodiment comprises an oil pressure type of clutch mechanism which includes a low speed clutch 140, a high speed clutch 141 and a reversing clutch 142. The low speed clutch 140 is interposed between the first transmission shaft 121 and output shaft 106. In case where the low speed clutch 140 is connected the sun gear 110, ring gear 112 and planetary gear sets 115 of the planetary gear mechanism 103 are prevented from shifting with respect to one another, whereby the sun gear 110 and ring gear 112 are connected to each other through the planetary gear sets 115. And, the high speed clutch 141 is interposed between the second transmission shaft 134 and ring gear 112. In case where the high speed clutch 141 is connected, the second transmission shaft 134 and ring gear 112 are coupled to each other.

The reversing clutch 142 is interposed between the ring gear 112 and the fixed portion 142a of the interior of a housing 171. In case where the reversing clutch 142 is connected, the ring gear 112 is fixed to the fixed portion 142a of the housing 171.

The low speed clutch 140, high speed clutch 141 and reversing clutch 142 are structured in the following manner; that is, they can be respectively driven by oil pressure and, when any one of the clutches is connected by oil pressure or by an electrical control circuit, the connection of the remaining two clutches can be cut off.

The output shaft 106 is connected to a differential gear 150 through a third power transmission mechanism 151. The third power transmission mechanism 151 comprises a second drive gear 152 and a second driven gear 153. Therefore, in case where the output shaft 106 is rotated, a pair of left and right drive shafts 154, 155 are rotated through the third power transmission mechanism 151 and differential gear 150, thereby being able to rotate the left and right drive wheels of the vehicle.

Between the transmission gear 122 of the first power transmission mechanism 104 and the fixed portion of the housing 171, there is interposed one-way clutch (not shown). The one-way clutch has a function which not only allows the composing parts (such as the transmission shaft 121 and transmission gear 122) of the present continuously variable transmission apparatus to rotate in their respective given directions but also prevents the composing parts from rotating in the opposite directions.

Next, description will be given below of the operation of the above-structured planetary gear mechanism 103.

In the low speed running operation, the low speed clutch 140 is connected, whereas the connection of the high speed clutch 141 and reversing clutch 142 is cut off. In this state, in case where the drive shaft 108 is rotated by the power of the engine 107, and also, in case where the start clutch 133 is connected and the input shaft 130 is thereby rotated, in the low speed running operation, only the toroidal-type continuously variable transmission 102 is allowed to transmit the power for the following reasons.

That is, in case where the low speed clutch 140 is connected, the sun gear 110, carrier 111 and ring gear 112 are coupled to one another. This prevents the sun gear 110, ring gear 112 and planetary gear sets 115 of the planetary gear mechanism 103 from rotating with respect to one another. Also, since the connection of the high speed clutch 141 and reversing clutch 142 is cut off, the carrier 111 is allowed to rotate regardless of the rotation speed of the driven gear 132 that is fixed to the second transmission shaft 134.

Therefore, the rotational power of the input shaft 130 is transmitted through the loading cam mechanism 143 to the pair of input side disks 117a, 117b and is further transmitted through the power rollers 4a, 4b to the pair of output side disks 118a, 118b. And, the rotational power of these output side disks 118a, 118b is transmitted through the intermediate gear 123 and transmission gear 122 respectively constituting the first power transmission mechanism 104 to the carrier 111. In the low speed running operation, because the gears 110, 112 and 115 of the planetary gear mechanism 103 are prevented from rotating with respect to one another, the output shaft 106 coupled to the sun gear 110 is allowed to rotate at the same speed as the sun gear 110 and carrier 111.

In the low speed running operation, the transmission ratio of the whole of the continuously variable transmission apparatus corresponds to the transmission ratio of the toroidal-type continuously variable transmission 102. Also, the torque that is input to the toroidal-type continuously variable transmission 102 is equal to the torque that is input to the input shaft 130. And, in the low speed running operation, the drive gear 131 and driven gear 132 constituting the second power transmission mechanism 105 idle respectively.

In the low speed running operation, since all of the power transmitted from the input shaft 130 to the output shaft 106 is allowed to pass through the toroidal-type continuously variable transmission 102, the transmission efficiency of the whole of the continuously variable transmission apparatus is determined by the transmission efficiency of the toroidal-type continuously variable transmission 102.

Also, in the high speed running operation, the high speed clutch 141 is connected, whereas the connection of the low speed clutch 140 and reversing clutch 142 is cut off. In this state, in case where the input shaft 130 is rotated, the rotation power of the input shaft 130 is transmitted through the drive gear 131 and driven gear 132 respectively constituting the second power transmission mechanism 105 and also through the planetary gear mechanism 103 to the output shaft 106.

That is, in case where the input shaft 130 is rotated in the high speed running operation, the rotation power of the input shaft 130 is transmitted through the second, power transmission mechanism 105 and high speed clutch 141 to the ring gear 112, so that the ring gear 112 is rotated. The rotation power of the ring gear 112 is transmitted through the planetary gear sets 115 to the sun-gear 110, thereby rotating the output shaft 106 that is fixed to the sun gear 110.

In a structure where the ring gear 112 is disposed on the input side as in the above-mentioned case, assuming that the carrier 111 stops, the planetary gear mechanism 103 transmits the power between the ring gear 112 and sun gear 110 according to the transmission ratio (a value of less than 1) that corresponds to the teeth number ratio of the ring gear 112 and sun gear 110. However, actually, since the carrier 111 rotates inside the ring gear 112, the transmission ratio of the whole of the continuously variable transmission apparatus varies according to the rotation speed of the carrier 111. For this reason, in case where the transmission ratio of the toroidal-type continuously variable transmission 102 is varied to change the rotation speed of the carrier 111, the transmission ratio of the whole of the continuously variable transmission apparatus can be changed.

In enforcing the present embodiment, in the high speed running operation, the carrier 111 rotates in the same direction as the ring gear 112 and sun gear 110. For this reason, the slower the rotation speed of the carrier 111 is, the more quickly the output shaft 106 disposed on the sun gear 110 rotates. For example, in case where the toroidal-type continuously variable transmission 102 is set in the maximum speed increasing state and the rotation speed (the angular speed) of the ring gear 112 is set equal to the rotation speed (the angular speed) of the carrier 111, the rotation speed of the ring gear 112 is equal to the rotation speed of the output shaft 106. On the other hand, in case where the rotation speed of the carrier 111 is slower than the rotation speed of the ring gear 112, the rotation speed of the output shaft 106 is faster than the rotation speed of the ring gear 112.

Therefore, in the high speed running operation, as the transmission ratio of the toroidal-type continuously variable transmission 102 increases (that is, it is varied toward the speed reducing side), the transmission ratio of the whole of the continuously variable transmission apparatus varies toward the speed increasing side. In such high speed running operation, to the toroidal-type continuously variable transmission 102, there is input the torque not from the input side disks 117a, 117b but from the output side disks 118a, 118b.

That is, assuming that the torque to be applied in the low speed running operation is positive torque, in the high speed running operation, there is applied negative torque.

In the case of the present continuously variable transmission apparatus, the drive gear 131 of the second power transmission mechanism 105 exists on the upstream side (on the engine 107 side) of the loading cam mechanism 143. Therefore, in a state where the high speed clutch 141 is connected, the torque transmitted from the engine 107 to the input shaft 130 is transmitted through the second power transmission mechanism 105 to the ring gear 112 of the planetary gear mechanism 103 before the loading cam mechanism 143 presses the input side disk 117a. Accordingly, there exists little torque which is transmitted from the input shaft 130 through the loading cam mechanism 143 to the input side disks 117a, 117b.

The torque transmitted through the second power transmission mechanism 105 to the ring gear 112 of the planetary gear mechanism 103 in the high speed running operation is in part transmitted from the planetary gear sets 115 through the carrier 111 and first power transmission mechanism 104 to the output side disks 118a, 118b. As the speed reducing ratio of the toroidal-type continuously variable transmission 102 increases, that is, as the transmission ratio of the whole of the continuously variable transmission apparatus varies toward the speed increasing side, the torque to be input from the output-side disks 118a, 118b to the toroidal-type continuously variable transmission 102 decreases. As a result of this, in the high speed running operation, the torque to be input the toroidal-type continuously variable transmission 102 decreases, which makes it possible to enhance the durability of the toroidal-type continuously variable transmission 102, As described above, since the toroidal-type continuously variable transmission 102 and planetary gear mechanism 103 are combined together to thereby constitute a continuously variable transmission apparatus of a power circular type (a power split type), the torque to be input to the toroidal-type continuously variable transmission 102 can be controlled down to a low level. This can reduce the loads that are applied to the composing parts of the toroidal-type continuously variable transmission 102 such as the disks 117a, 117b, 118a, 118b and power rollers 4a–4d which are involved with the torque transmission, so that the durability of these parts can be secured sufficiently.

As can be seen clearly from the foregoing description, the transmission ratio of the whole of the continuously variable transmission apparatus, in the low speed running operation, varies in proportion to the transmission ratio of the toroidal-type continuously variable transmission 102, whereas, in the high speed running operation, it varies in reverse proportion to the transmission ratio of the toroidal-type continuously variable transmission 102.

Therefore, assuming that the vehicle gradually increases the speed thereof from the stopping state thereof, the transmission ratio of the toroidal-type continuously variable transmission 102, while the low speed clutch 140 is being connected, gradually decreases (that is, varies toward the speed increasing side) as the speed of the vehicle increases. And, after the high speed clutch 141 is connected, the transmission ratio of the toroidal-type continuously variable transmission 102 gradually increases (that is, varies toward the speed reducing side) as the speed of the vehicle increases.

That is, in the switching time for switching the low speed and high speed running operations, the transmission ratio of the toroidal-type continuously variable transmission 102 becomes the smallest (which shows the maximum speed increasing state). For example, a ratio $\beta/\alpha$ between the speed reducing ratio a (for example, about 2) of the first power transmission mechanism 104 and the speed reducing ratio $\beta$ (for example, about 1) of the second power transmission mechanism 105 is set substantially equal to the speed reducing ratio $i_H$ (for example, about 0.5) of the toroidal-type continuously variable transmission 102 in the maximum speed increasing time. Therefore, in the switching time for switching the low speed and high speed running operations, the transmission ratio of the whole of the continuously variable transmission apparatus can be restricted from varying suddenly, so that the low speed and high speed running operations can be switched smoothly.

As described above, in the low speed mode, there is used only the first power transmission mechanism 104 which transmits the torque only through the toroidal-type continuously variable transmission 102; and, therefore, when viewed from the toroidal-type continuously variable transmission 102, the torque is transmitted from the input side to the output side. On the other hand, on the high speed side, since the two power transmission mechanisms 104, 105 are joined with the planetary gear mechanism 103, when viewed from the toroidal-type continuously variable transmission 102, the torque is transmitted from the output side to the input side; that is, there is input the negative torque.

When rotating the output shaft 106 reversely in order to back the vehicle, the connection of the low speed clutch 140 and high speed clutch 141 is cut off and also the reversing clutch 142 is connected, thereby fixing the ring gear 112. Due to this, the carrier 111 can be driven or rotated through the toroidal-type continuously variable transmission 102 and first power transmission mechanism 104; and, at the same time, since the planetary gear sets 115 rotate around the sun gear 110 while they are rotating about their own axes, the sun gear 110 and output shaft 106 are rotated in the opposite direction to the low speed and high speed running operations.

In the present embodiment, there is disposed control unit 160 which uses a microcomputer carried on board a vehicle. As will be discussed below, the control unit 160 controls a transmission control valve 170 simultaneously with the speed mode switching operation to thereby be able to solve the problems found in the conventional toroidal-type continuously variable transmission (that is, the characteristics thereof shown in FIG. 12). That is, the control of the transmission control valve 170 is started simultaneously with the start of the switching of the clutches 140, 141 when switching the speed modes, that is, simultaneously with the start of the torque variation; and, the control of the transmission control valve 170 is ended simultaneously with the end of the switching of the clutches 140, 141, that is, simultaneously with the end of the torque variation.

Figure 8:
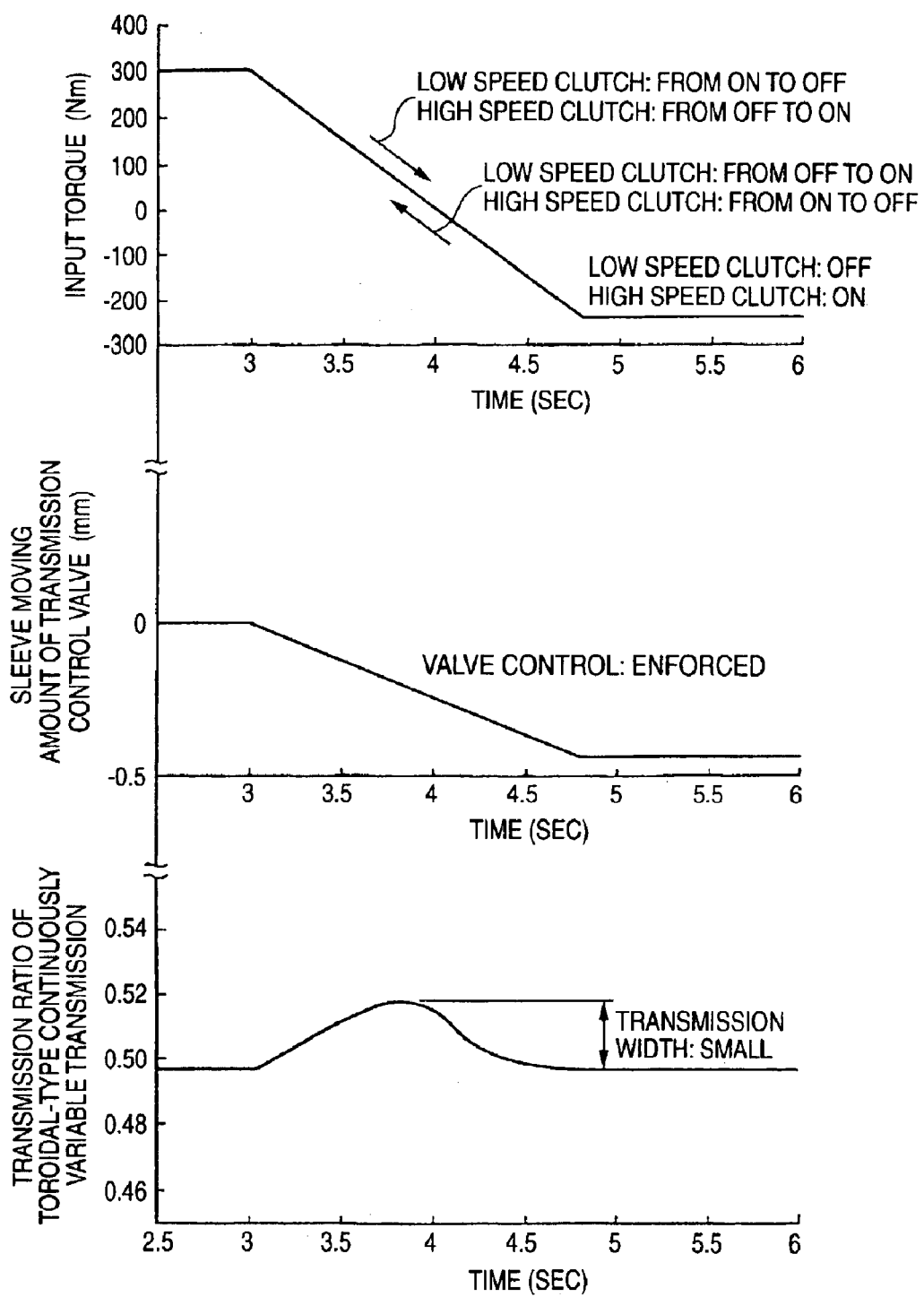
FIG. 8 is a graphical representation of the relationship between the input torque and thee operation timings of the transmission control valve of the continuously variable transmission apparatus shown FIG. 4.

Specifically, when the toque starts to vary, that is, at the very moment the clutches 140, 141 are switched, the control is started and the transmission control is ended before the connection of the clutches 140, 141 is completed. For example, as shown in FIG. 8, in the time of "3 sec." in the horizontal axis, the low speed mode clutch 140 is cut and, just before the time of "5 sec.", the connection of the high speed mode clutch is completed. During this period, the clutches 140, 141 are being switched gradually.

The term "transmission control" used here means that, by driving a stepping motor 172 connected to the sleeve 173 of the transmission control valve 170 as shown in FIG. 7, the sleeve 173 is moved and thus the transmission control valve 170 is switched to thereby allow the pistons 159 of actuators 161–164 to generate differential pressure. Due to this transmission control, the power rollers 4a–4d are shifted in the vertical direction to thereby reduce variations in the transmission ratio that occur in the speed mode switching operation. Here, before switching the clutches 140, 141, for example, the accelerator pedal is checked for the opening and closing angle thereof to thereby calculate in advance the torque that would be generated after the clutches are switched, or while reading torque variations from a previously prepared map, the sleeve 173 is driven so that transmission control corresponding to the torque variations can be done.

In FIG. 8, torque of 300 Nm has been input from the engine to the toroidal-type continuously variable transmission 102 and, within the time of 3 sec. during which the switching operation of the clutches 140, 141 is started, the control of the transmission control valve 170 is started simultaneously with the clutch switching operation. At the time when the clutches 140, 141 are switched to generate power circulation in the toroidal-type continuously variable transmission 102, torque is input into the toroidal-type continuously variable transmission 102 from the output disk 118a, 118b side and torque of −240 Nm is input onto the input side disks 117a, 117b, the control of the transmission control valve 170 is ended; that is, at the time when the connection of the clutches 140, 141 is completed and thus the clutches 140, 141 are switched completely, the control of the transmission control valve 170 is ended.

Thanks to this, when compared with the characteristics of the conventional toroidal-type continuously variable transmission, in the toroidal-type continuously variable transmission 102, the width of the variations of the transmission ratio is reduced and, before and after the clutches are switched, the transmission ratios are almost the same. As a result of this, the number of rotations of the engine varies little, which makes it possible not only to prevent the engine from increasing suddenly in the number of rotations thereof but also to prevent the toroidal-type continuously variable transmission 102 against vibration.

While the foregoing description relates to the switching operation for switching the low speed mode over to the high speed mode, such description can also apply similarly to the switching operation for switching the high speed mode over to the low speed mode. In this case, by driving the sleeve 173 in the opposite direction to the above description, there can be obtained a similar effect. That is, at the time when the torque starts to vary, the control of the transmission control valve 170 is started; and, simultaneously when the torque variation is ended or before the torque variation is ended, the control of the transmission control valve 170 is ended. In the switching operation for switching the high speed mode over to the low speed mode, the torque varies, for example, from −240 Nm to 300 Nm.

Also, in the above-mentioned case, description has been given of the case where the engine outputs positive torque. However, even in case where the engine outputs negative torque as in the case of engine braking, the control of the transmission valve 170 can be carried out in accordance with a similar concept to the above case.

Figure 9:
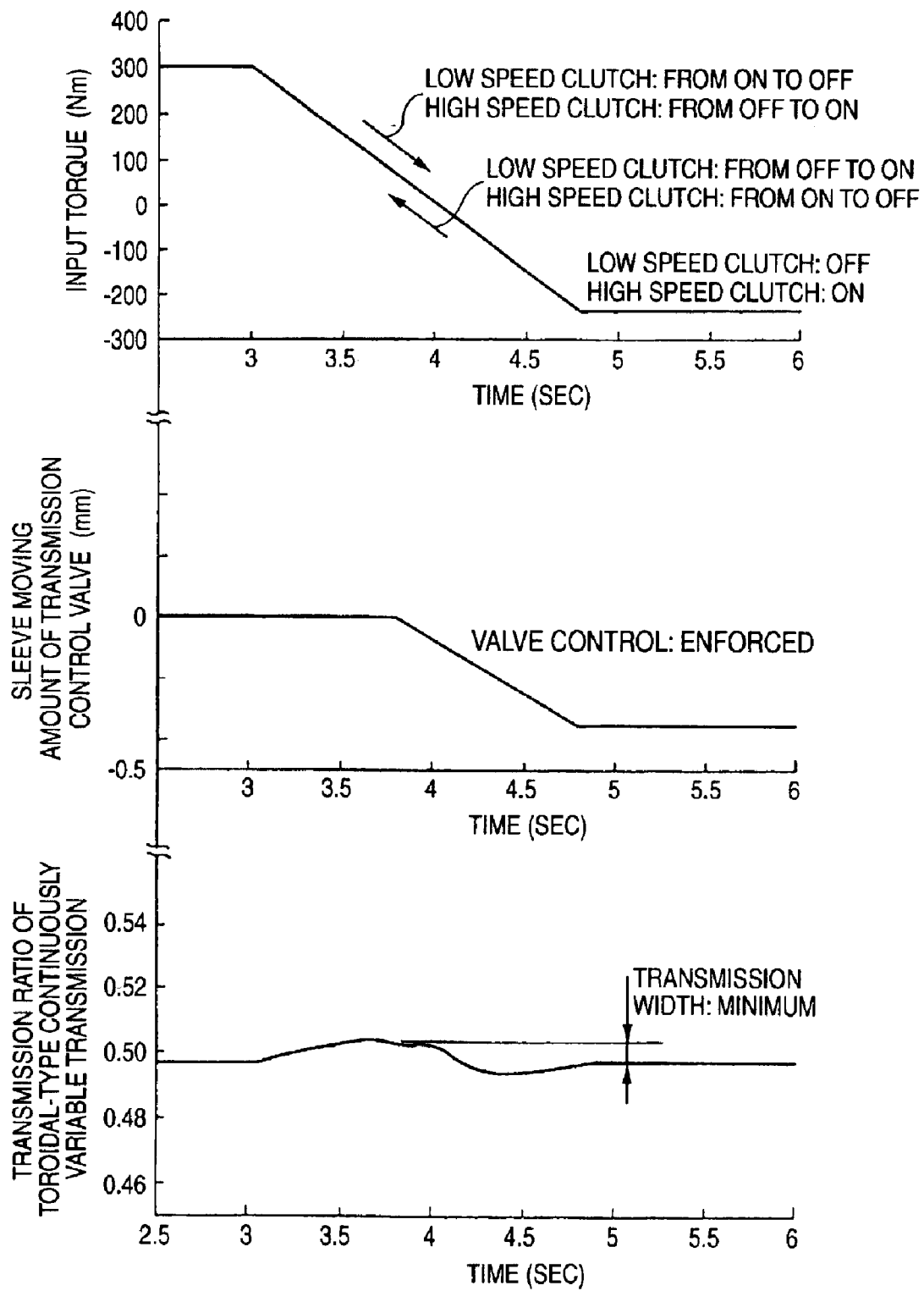
FIG. 9 is a graphical representation of the relationship between the input torque and the operation timings of the transmission control valve of a continuously variable transmission apparatus according to a fourth embodiment of the present invention.
Figure 10:
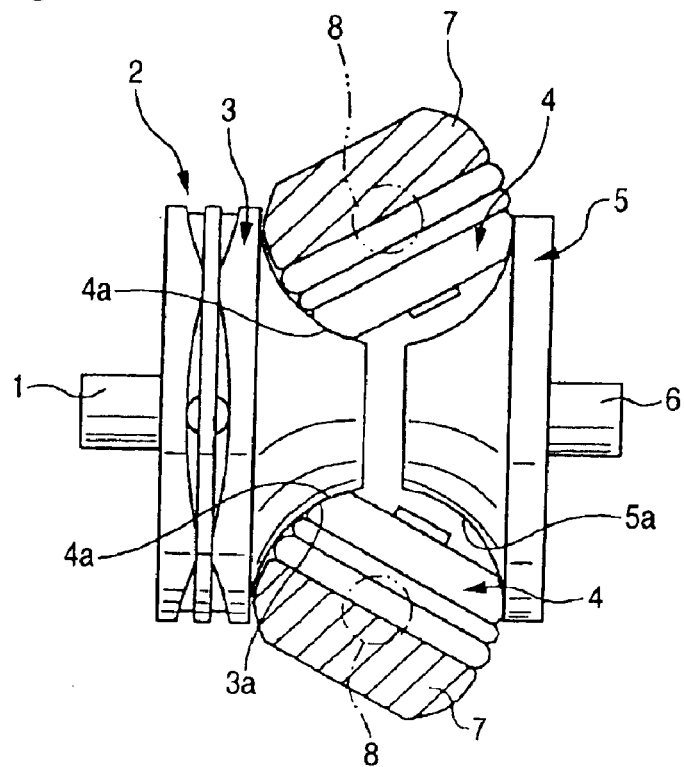
FIG. 10 is a schematic side view of the basic structure of a toroidal-type continuously variable transmission, showing a maximum speed reducing state thereof.
Figure 11:
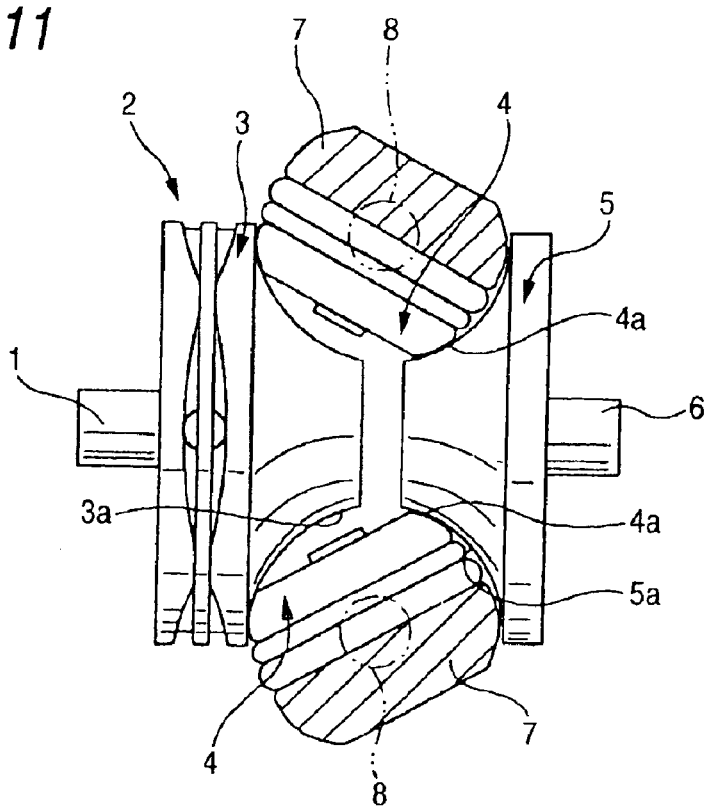
FIG. 11, similarly to FIG. 10, is a schematic side view of the basic structure of the toroidal-type continuously variable transmission, showing a maximum speed increasing state thereof.
Figure 12:
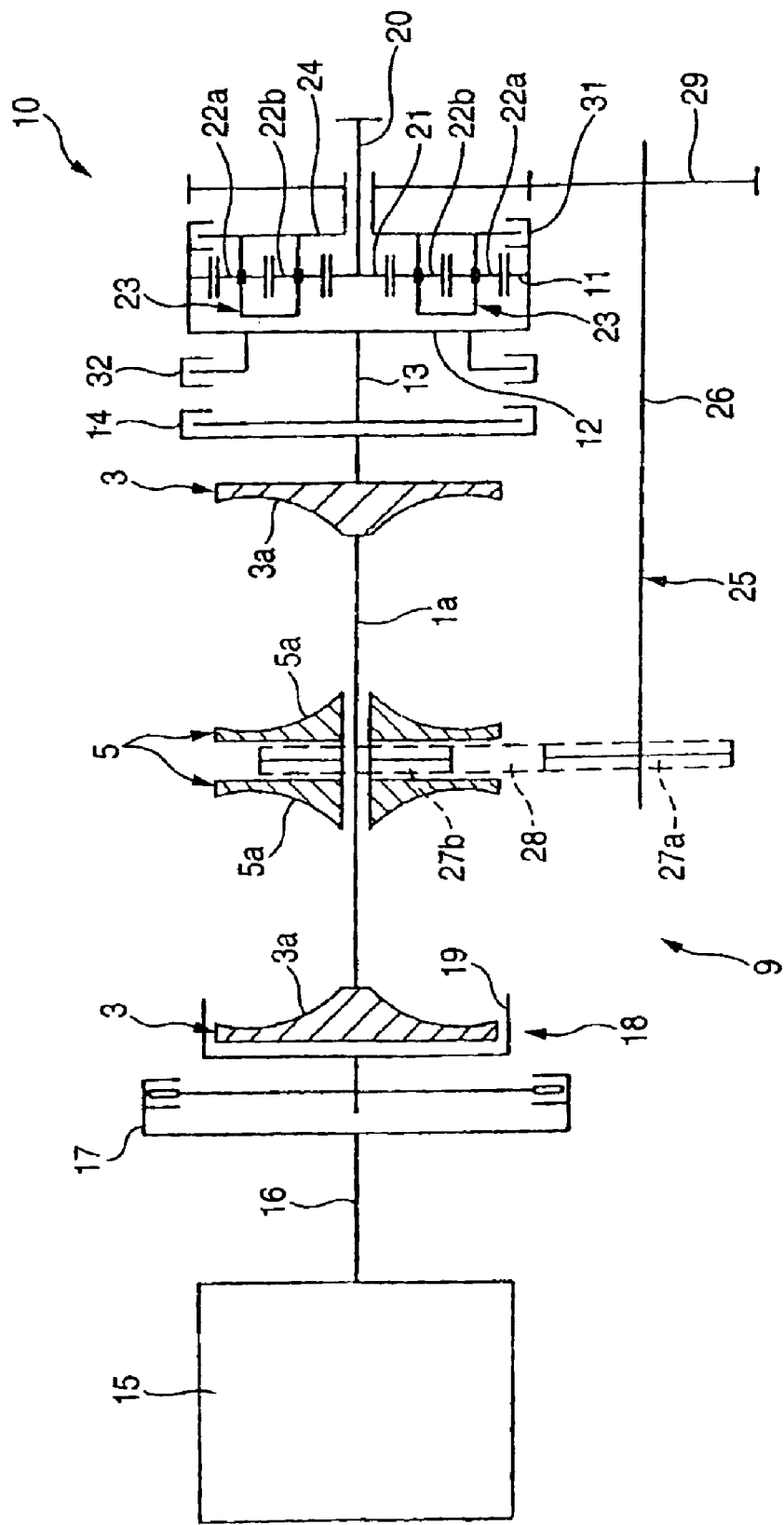
FIG. 12 is a schematic section view of an example of a continuously variable transmission apparatus incorporating a toroidal-type continuously variable transmission therein.

By the way, as in a fourth embodiment of the present invention shown in FIG. 9, in the switching operation for switching the low speed mode over to the high speed mode, in case where the transmission control is started slightly after the start of the clutch switching operation, that is, slightly after the start of the torque variation, the variation width in the transmission ratio of the toroidal-type continuously variable transmission 102 can be restricted to a further small range.

Specifically, in the time of "3 sec." in the horizontal axis of FIG. 9, the switching operation of the clutches is started and, slightly after the start of the clutch switching operation and just before the time of "4 sec.", the above-mentioned transmission control is started. And, at the time when the clutch switching operation is ended, the transmission control is ended. As a result of this, the variation width in the transmission ratio of the toroidal-type continuously variable transmission 102 can be reduced further. Therefore, according to the fourth embodiment of the present invention shown in FIG. 9, there can be obtained a better result than the third embodiment shown in FIG. 8.

In the above described embodiment, the speed mode switching operation is executed in about 2 seconds. However, even in case where the speed mode switching time, that is, the clutch switching time is reduced down to e.g. 1 second or less, there can be obtained a similar effect.

Also, the present invention can also apply to a geared neutral type of continuously variable transmission apparatus In the case of a geared neutral type of continuously variable transmission apparatus, in a first mode on the low speed side, two power transmission systems, that is, a toroidal-type continuously variable transmission and a planetary gear mechanism are used to transmit the power; and, in a second mode on the high speed side, the power is transmitted only through the toroidal-type continuously variable transmission. In this case, in the low speed side mode, in case where the differential component of the planetary gear mechanism taken out by the output shaft is set for zero rotation, there can be eliminated the need for provision of a start clutch.

In a geared neutral type of continuously variable transmission apparatus, when the toroidal-type continuously variable transmission is set on the low speed side, the first and second modes are switched over to each other. In such geared neutral type of continuously variable transmission apparatus as well, by executing the above-mentioned transmission control in the mode switching operation, there can be obtained a similar effect to a power circulation type of continuously variable transmission apparatus.

The present invention can apply not only to a double cavity type of continuously variable transmission apparatus but also to a single cavity type of continuously variable transmission apparatus similarly. Further, the application of the present invention is not limited to a continuously variable transmission apparatus in which two power rollers can be disposed in each cavity, but the present invention can also apply to a continuously variable transmission apparatus in which the number of power rollers to be disposed in each cavity is three or more.

By the way, the present invention is effective in a continuously variable transmission apparatus including two or more modes in which, in the mode switching operation, torque passing through a toroidal-type continuously variable transmission is reversed, for example, in such a continuously variable transmission apparatus as disclosed in JP-A-2000-220719 which does not include a counter shaft in the same shaft of a combination of a toroidal-type continuously variable transmission and several stages of planetary gears, but includes two low speed and high speed modes. Also, in the above-mentioned description, there is used a loading cam mechanism which is a pressing mechanism of a mechanical type. However, even in case where, instead of the pressing mechanism of a mechanical type, there is used such a pressing mechanism of an oil pressure type as disclosed in JP-A-11-63146, the present invention can provide a similar effect.

According to the first aspect of the present invention, in a continuously variable transmission apparatus in which a toroidal-type continuously variable transmission and a planetary gear mechanism are combined together, the amount of variations in a transmission ratio occurring in the mode switching operation can be reduced and thus the occurrence of a transmission shock can be restricted.

Also, according to the second aspect of the present invention, the amount of variations in a transmission ratio occurring in the mode switching operation can be reduced still further.

What is claimed is:

1. A continuosly variable transmission apparatus comprising a toroidal-type continuously variable transmission, a planetary gear mechanism and a clutch device, the clutch device comprising:
    a low speed clutch connected in order to increase a speed reducing ratio and disconnected in order to decrease the speed reducing ratio;
    a high speed clutch connected in order to decrease a speed reducing ratio and disconnected in order to increase the speed reducing ratio; and,
    a controller for switching over the connected and disconnected states of the respective clutches to each other, the controller switching the transmission state of the continuously variable transmission apparatus into any one of a low speed mode and a high speed mode by connecting any one of the clutches,
    wherein timings for signaling by the controller for switching the connected and disconnected states of the clutches vary according to the switching directions of the low speed and high speed modes; and, a timing for signaling for connecting the low speed clutch with respect to the moment for signaling for cutting off the connection of the high speed clutch in order to switch the high speed mode over to the low speed mode is set earlier than a timing for signaling for connecting the high speed clutch with respect to the moment for signaling for cutting off the connection of the low speed clutch in order to switch the low speed mode over to the high speed mode.

2. A continuously variable transmission apparatus, comprising:
    an input shaft connected to a drive source and rotationally driven by the drive source;
    an output shaft for taking out power obtained based on the rotational movement of the input shaft;
    a toroidal-type continuously variable transmission;
    a planetary gear mechanism;
    a first power transmission mechanism for transmitting power input to the input shaft through the toroidal-type continuously variable transmission;
    a second power transmission mechanism for transmitting power input to the input shaft without passing through the toroidal-type continuously variable transmission;
    a controller;
    the planetary gear mechanism, comprising:
    a sun gear;
    a ring gear disposed on the periphery of the sun gear;
    a planetary gear interposed between the sun gear and the ring gear so as to be meshingly engaged with the sun gear and the ring gear; and,
    a carrier for supporting the planetary gear so as to be rotated,
    wherein the power to be transmitted through the first power transmission mechanism and the power to be transmitted through the second power transmission mechanism are freely transmitted to two of the sun gear, the ring gear and the carrier, and the output shaft is connected to the remaining one of the sun gear, the ring gear and the carrier; and
    a mode switching mechanism for switching the state of the power input to the input shaft when the power is transmitted through the first and second power transmission mechanisms to the planetary gear mechanism,
    wherein the mode switching mechanism switches over first and second modes to each other, the first mode for transmitting the power by at least only the first power transmission mechanism, the second mode for transmitting the power by both of the first and second power transmission mechanisms,
    the controller connects only one of clutches constituting the mode switching mechanism to thereby set the transmission state of the continuously variable transmission apparatus into one of a low speed mode and a high speed mode, the low speed mode being one of the first and second modes, the high speed mode being the other of the first and second modes, and
    timings for signaling by the controller for switching the connection and disconnection of the clutches vary according to the switching directions of the low speed and high speed modes, a timing for signaling for connecting a low speed clutch to be connected when realizing the low speed mode with respect to the moment for signaling for cutting off the connection of a high speed clutch to be connected when realizing the high speed mode in order to switch over the high speed mode to the low speed mode is set earlier than a timing for signaling for connecting the high speed clutch with respect to the moment for signaling for cutting off the connection of the low speed clutch in order to switch over the low speed mode to the high speed mode.

3. A continuously variable transmission apparatus, comprising:
    an input shaft connected to a drive source and rotationally driven by the drive source;
    an output shaft for taking out power obtained based on the rotational movement of the input shaft;
    a toroidal-type continuously variable transmission including an input side disk, an output side disk, power rollers interposed between the input side and output side disks so as to be swingly rotatable, and trunnions for supporting the power rollers;
    a transmission control valve for shifting the trunnions;
    a feedback mechanism for transmitting the shift amounts of the trunnions to the transmission control valve for feedback so that a transmission ratio between the input and output disks provide a target value;
    a planetary gear mechanism including three elements, that is, a sun gear, a carrier and a ring gear;
    a first power transmission system for transmitting the power input to the input shaft to the output shaft through the toroidal-type continuously variable transmission;
    a second power transmission system for transmitting the power input to the input shaft to the output shaft without passing through the toroidal-type continuously variable transmission, the power to be transmitted through the first power transmission system and the power to be transmitted through the second power transmission system being joined to two of the three elements of the planetary gear mechanism, the remaining one of the three elements being connected to the output shaft;

a clutch mechanism, when advancing a vehicle, for switching over a first mode on the low speed side and a second mode on the high speed side to each other; and, a control device, when switching over the first and second modes to each other, for controlling the transmission control valve simultaneously with the switching operation of the clutch mechanism within the time during which the clutch mechanism is switched, thereby restricting variations in the transmission ratio of the toroidal-type continuously variable transmission, wherein the control device, when the clutch mechanism is switched from the first mode on the low speed side to the second mode on the high speed side, starts the control of the transmission control valve later than the time when the switching operation of the clutch mechanism is started and completes the control of the transmission control valve at the time when the switching operation of the clutch mechanism is completed; and, when the second mode is switched over to the first mode, the control device starts the control of the transmission control valve at the time when the switching operation of the clutch mechanism is started and completes the control of the transmission control valve earlier than the time when the switching operation of the clutch mechanism is completed.

* * * * *